(12) United States Patent
Tadano et al.

(10) Patent No.: US 12,538,042 B2
(45) Date of Patent: Jan. 27, 2026

(54) IMAGING DEVICE AND METHOD FOR OPERATING IMAGING DEVICE

(71) Applicant: Sony Group Corporation, Tokyo (JP)

(72) Inventors: Ryuichi Tadano, Tokyo (JP); Ilya Reshetouski, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/725,163

(22) PCT Filed: Jan. 12, 2023

(86) PCT No.: PCT/JP2023/000538
§ 371 (c)(1),
(2) Date: Jun. 28, 2024

(87) PCT Pub. No.: WO2023/145444
PCT Pub. Date: Aug. 3, 2023

(65) Prior Publication Data
US 2025/0063263 A1     Feb. 20, 2025

(30) Foreign Application Priority Data
Jan. 27, 2022 (JP) .................. 2022-010939

(51) Int. Cl.
*H04N 23/955* (2023.01)
*G02B 5/20* (2006.01)

(52) U.S. Cl.
CPC .......... *H04N 23/955* (2023.01); *G02B 5/201* (2013.01)

(58) Field of Classification Search
CPC ...... H04N 23/955; H04N 25/10; H04N 25/70; G02B 5/201; G03B 15/00
See application file for complete search history.

(56) References Cited

U.S. PATENT DOCUMENTS

| 7,339,170 | B2* | 3/2008 | Deliwala ............... G01J 3/0229 250/351 |
| 9,880,054 | B2* | 1/2018 | McMackin ............... G01J 3/18 |
| 9,979,470 | B2* | 5/2018 | Flettner ............... H04J 14/0227 |

(Continued)

FOREIGN PATENT DOCUMENTS

| JP | 2021-135404 A | 9/2021 |
| WO | WO 2019/124106 A1 | 6/2019 |
| WO | WO 2019/182029 A1 | 9/2019 |

*Primary Examiner* — Hung H Lam
(74) *Attorney, Agent, or Firm* — Paratus Law Group, PLLC

(57) ABSTRACT

There is provided an imaging device capable of improving the image quality of a reconstructed image in lensless imaging, and a method for operating the imaging device. In lensless imaging, a selection filter is provided that, for each of a plurality of regions into which an imaging surface on the imaging element is divided, allows only the modulated light having optical characteristics that are orthogonal to each other between the regions adjacent to each other, to pass through. With a sub-area set for each selection filter as a unit, the modulation mask converts the incident light into modulated light having optical characteristics corresponding to the selection filter based on at least one of polarization and spectroscopy. The present disclosure can be applied to an imaging device.

12 Claims, 19 Drawing Sheets

(56) References Cited

U.S. PATENT DOCUMENTS

| | | | |
|---|---|---|---|
| 2008/0219579 A1* | 9/2008 | Aksyuk | G02B 26/06 |
| | | | 382/248 |
| 2012/0038817 A1* | 2/2012 | McMackin | H04N 23/74 |
| | | | 348/E5.045 |
| 2021/0349324 A1* | 11/2021 | Vuong | G02B 3/0006 |
| 2022/0196385 A1* | 6/2022 | Yuan | G01J 3/0229 |

* cited by examiner

Fig. 10

|  | VERTICALLY POLARIZED | HORIZONTALLY POLARIZED |
|---|---|---|
| Blue | Type A | Type B |
| Red | Type C | Type D |

Fig. 13

| COMBINATIONS OF LIGHT TRANSMISSION/BLOCKING OF LIGHT TRANSMISSION/BLOCKING ADJUSTMENT REGIONS FOR RESPECTIVE SUB-AREA MASKS | | | APPLICATION EXAMPLES OF LIGHT TRANSMISSION/BLOCKING ADJUSTMENT REGIONS IN OVERLAPPING REGION |
|---|---|---|---|
| BLUE AND HORIZONTALLY POLARIZED | BLUE AND VERTICALLY POLARIZED | RED AND UNPOLARIZED | |
| □ | □ | □ | □ |
| □ | □ | ■ | ▨ |
| □ | ■ | □ | ▤ |
| □ | ■ | ■ | ▨ |
| ■ | □ | □ | ▥ |
| ■ | □ | ■ | ▨ |
| ■ | ■ | □ | ▨ |
| ■ | ■ | ■ | ■ |

Fig. 17

| Combinations of light transmission/blocking of light transmission/blocking adjustment regions for respective sub-area masks | | | Application examples of light transmission/blocking adjustment regions in overlapping region |
|---|---|---|---|
| Type : AB | Type : A'B | Type : B' | |
| ☐ | ☐ | ☐ | WHITE |
| ☐ | ☐ | ■ | B |
| ☐ | ■ | ☐ | A |
| ☐ | ■ | ■ | AB |
| ■ | ☐ | ☐ | A' |
| ■ | ☐ | ■ | A'B |
| ■ | ■ | ☐ | B' |
| ■ | ■ | ■ | BLACK |

Fig. 19

| COMBINATIONS OF LIGHT TRANSMISSION/BLOCKING OF LIGHT TRANSMISSION/BLOCKING ADJUSTMENT REGIONS FOR RESPECTIVE SUB-AREA MASKS | | | APPLICATION EXAMPLES OF LIGHT TRANSMISSION/BLOCKING ADJUSTMENT REGIONS IN OVERLAPPING REGION |
|---|---|---|---|
| BLUE AND VERTICALLY POLARIZED | RED AND VERTICALLY POLARIZED | WHITE AND HORIZONTALLY POLARIZED | |
| □ | □ | □ | □ |
| □ | □ | ■ | ▥ |
| □ | ■ | □ | ▨ |
| □ | ■ | ■ | ▨ |
| ■ | □ | □ | ▨ |
| ■ | □ | ■ | ▨ |
| ■ | ■ | □ | ☰ |
| ■ | ■ | ■ | ■ |

IMAGING DEVICE AND METHOD FOR OPERATING IMAGING DEVICE

CROSS REFERENCE TO PRIOR APPLICATION

This application is a National Stage Patent Application of PCT International Patent Application No. PCT/JP2023/000538 (filed on Jan. 12, 2023) under 35 U.S.C. § 371, which claims priority to Japanese Patent Application No. 2022-010939 (filed on Jan. 27, 2022), which are all hereby incorporated by reference in their entirety.

TECHNICAL FIELD

The present disclosure relates to an imaging device and a method for operating the imaging device, and more particularly to an imaging device capable of improving the image quality of a reconstructed image in lensless imaging, and a method for operating the imaging device.

BACKGROUND ART

A lensless imaging device has a configuration in which a mask having transmission regions that transmit incident light and light-blocking regions that do not transmit incident light is disposed in front of the imaging surface of an imaging element.

In this lensless imaging device, the incident light is modulated by the mask, the modulated incident light is captured as a modulated image by the imaging element, and signal processing is performed on the modulated image to generate a reconstructed image including the incident light.

In order to increase the resolution of such a reconstructed image, a technology has been proposed in which a mask is divided into a plurality of sub-areas, bandpass filters are provided that pass different wavelengths for the sub-areas, respectively and a mask design optimal for each wavelength is selected (see PTL 1).

A technology has also been proposed to improve the image quality of a reconstructed image in a manner that a mask is divided into sub-areas in the spatial direction and a different phase pattern is placed in each sub-area to acquire different phase information for each sub-area, thereby generating the reconstructed image (see PTL 2).

CITATION LIST

Patent Literature

PTL 1:
  WO 2019/124106
PTL 2:
  WO 2019/182029

SUMMARY

Technical Problem

However, in PTL 1 and PTL 2, there is a risk that light from adjacent sub-areas may be mixed and incident, which may degrade the image quality of the reconstructed image.

In respect of this, PTL 1 proposes a measure to provide a light-blocking wall at the boundary between the sub-areas. However, this may increase manufacturing costs.

If no light-blocking wall is provided, it is necessary to ensure an appropriate margin between the sub-areas in the imaging element, which may reduce the area available for imaging on the imaging element, resulting in a decrease in resolution.

The present disclosure has been made in view of such circumstances, and aims to improve the image quality of a reconstructed image, particularly in lensless imaging, by increasing the area available for imaging on an imaging element to improve the area efficiency of the imaging element.

Solution to Problem

An imaging device according to one aspect of the present disclosure includes: a modulation mask that converts incident light into modulated light by modulating the incident light; an imaging element that captures a modulated image formed from the modulated light that has passed through the modulation mask; a selection filter that, for each of a plurality of regions into which an imaging surface on the imaging element is divided, allows the modulated light having optical characteristics that are orthogonal to each other between the regions adjacent to each other to pass through toward the imaging element; and a reconstruction unit that reconstructs an image corresponding to the incident light based on the modulated image, wherein the modulation mask converts, with a sub-area set for each selection filter as a unit, the incident light into modulated light having optical characteristics corresponding to the selection filter based on at least one of polarization and spectroscopy.

A method for operating an imaging device according to one aspect of the present disclosure, the imaging device including: a modulation mask that converts incident light into modulated light by modulating the incident light; an imaging element that captures a modulated image formed from the modulated light that has passed through the modulation mask; a selection filter that, for each of a plurality of regions into which an imaging surface on the imaging element is divided, allows the modulated light having optical characteristics that are orthogonal to each other between the regions adjacent to each other to pass through toward the imaging element; and a reconstruction unit that reconstructs an image corresponding to the incident light based on the modulated image, wherein the modulation mask converts, with a sub-area set for each selection filter as a unit, the incident light into modulated light having optical characteristics corresponding to the selection filter based on at least one of polarization and spectroscopy, the method including the steps of: converting, by the modulation mask, incident light into modulated light by modulating the incident light; capturing, by the imaging element, a modulated image formed from the modulated light that has passed through the modulation mask; for each of a plurality of regions into which an imaging surface on the imaging element is divided, allowing, by the selection filter, the modulated light having optical characteristics that are orthogonal to each other between the regions adjacent to each other to pass through toward the imaging element; reconstructing, by the reconstruction unit, an image corresponding to the incident light based on the modulated image; and with a sub-area set for each selection filter as a unit, converting, by the modulation mask, the incident light into modulated light having optical characteristics corresponding to the selection filter based on at least one of polarization and spectroscopy.

According to one aspect of the present disclosure, incident light is converted into modulated light by modulating the incident light by a modulation mask; a modulated image formed from the modulated light that has passed through the modulation mask is captured by an imaging element; for each of a plurality of regions into which an imaging surface on the imaging element is divided, the modulated light having optical characteristics that are orthogonal to each other between the regions adjacent to each other is allowed to pass through toward the imaging element by a selection filter; an image corresponding to the incident light is reconstructed based on the modulated image by a reconstruction unit; and with a sub-area set for each selection filter as a unit, the incident light is converted by the modulation mask into modulated light having optical characteristics corresponding to the selection filter based on at least one of polarization and spectroscopy.

BRIEF DESCRIPTION OF DRAWINGS

FIG. 10 illustrates a configuration example of orthogonal optical characteristics.

FIG. 13 illustrates an example of filters applied to light transmission/blocking adjustment regions in overlapping regions of sub-area masks.

FIG. 17 illustrates an example of filters applied to light transmission/blocking adjustment regions in overlapping regions of the sub-area masks of FIG. 16.

FIG. 19 illustrates an example of filters applied to light transmission/blocking adjustment regions in overlapping regions of the sub-area masks when different optical characteristics are set for separation axes, based on the generalized example of arrangement of the sub-area masks of FIG. 16.

DESCRIPTION OF EMBODIMENTS

Figure 1:
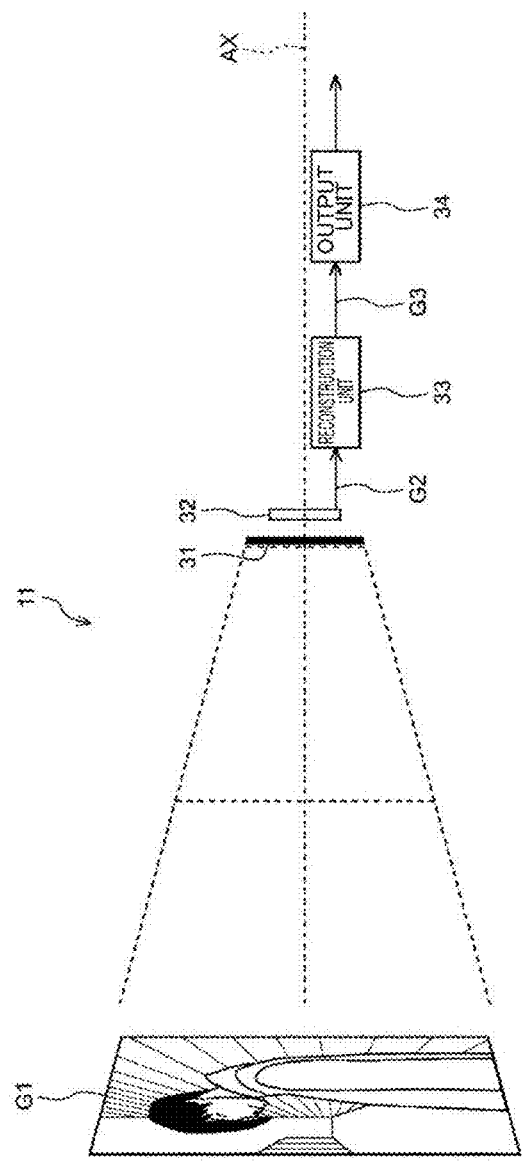
FIG. 1 is a diagram illustrating an overview of a lensless camera.

Preferred embodiments of the present disclosure will be described in detail with reference to the accompanying figures below. Also, in the present specification and the figures, components having substantially the same functional configuration will be denoted by the same reference numerals, and thus repeated descriptions thereof will be omitted.

An embodiment for implementing the present technology will be described below. The description will be made in the following order.

1. Overview of Lensless Imaging Device
2. Preferred Embodiment
3. Generalization

1. Overview of Lensless Imaging Device

The overview of a lensless imaging device will be described with reference to FIG. 1. FIG. 1 is a side cross-sectional view of the imaging device 11.

The imaging device 11 of FIG. 1 is a so-called lensless camera, and includes a mask 31, an imaging element 32, a reconstruction unit 33, and an output unit 34.

Figure 2:
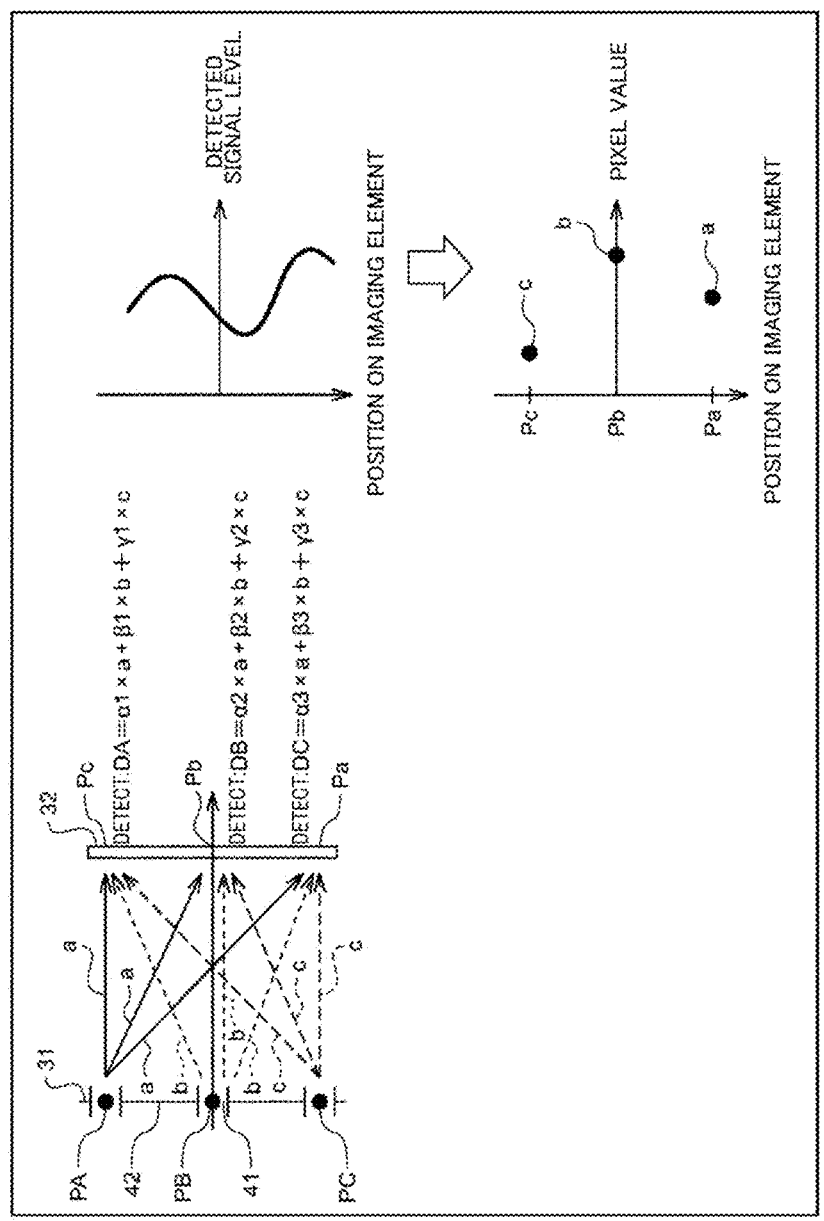
FIG. 2 illustrates the imaging principle of the lensless camera.

The mask 31 has a plate-like structure including a light-blocking material that is placed in front of the imaging element 32, and has transmission regions 41 that are hole-like openings that transmit incident light, and light-blocking regions 42 that block the rest of the light, as illustrated on the left side of FIG. 2, for example.

When the mask 31 receives light as incident light from a subject surface G1 indicated by an optical axis AX (actually a surface on which radiation light from a three-dimensional subject is emitted), the mask 31 transmits the incident light through the transmission regions 41, thereby modulating the incident light from the subject surface G1 as a whole to convert the incident light into modulated light, and causing the converted modulated light to be received and captured by the imaging element 32.

The imaging element 32 includes a complementary metal oxide semiconductor (CMOS) image sensor or a charge coupled device (CCD) image sensor, and captures an image of modulated light obtained by modulating the incident light from the subject surface G1 using the mask 31, and outputs the resulting image as a modulated signal G2 on a pixel-by-pixel basis to the reconstruction unit 33.

The mask 31 has a size that includes at least the entire surface of the imaging element 32, and is basically configured so that the imaging element 32 receives only the modulated light that has been modulated through the mask 31.

The transmission region 41 formed in the mask 31 has a size at least larger than the size of a pixel of the imaging element 32. A gap with a minute size d is provided between the imaging element 32 and the mask 31.

For example, as illustrated on an upper left side of FIG. 2, it is assumed that incident light from point light sources PA, PB, and PC on the subject surface G1 passes through the transmission regions 41 of the mask 31 and received as light rays with light intensities a, b, and c at positions Pa, Pb, and Pc on the imaging element 32, respectively.

As illustrated on the upper left side of FIG. 2, the detection sensitivity of each pixel has directivity according to an incidence angle by the incident light being modulated by the transmission regions 41 set on the mask 31. The detection sensitivity of each pixel having incidence angle directivity as used herein refers to having light reception sensitivity characteristics according to the incidence angle of the incident light different depending on a region on the imaging element 32.

Specifically, when it is assumed that a light source that forms the subject surface G1 is a point light source, light rays with the same light intensity emitted from the same point light source are incident on the imaging element 32, while the light rays are modulated by the mask 31 to have incidence angles different depending on the respective regions on the imaging surface of the imaging element 32. Since the incidence angle of the incident light is changed due to the mask 31 depending on the region on the imaging element 32, the light reception sensitivity characteristics, that is, the incidence angle directivity is obtained, even when light rays have the same light intensity, the light rays are detected with different sensitivities for the respective regions on the imaging element 32 due to the mask 31 provided in front of the imaging surface of the imaging element 32, and detected signals at different detected signal levels are detected for the respective regions.

More specifically detected signal levels DA, DB, and DC of the pixels at the positions Pa, Pb, and Pc on the imaging element 32 are represented by the following Equations (1) to (3), respectively as illustrated on the upper right side of FIG. 2. Equations (1) to (3) in FIG. 2 are reversed in a vertical relationship with the positions Pa, Pb, and Pc on the imaging element 32 in FIG. 2.

$$DA = a1 \times a + \beta1 \times b + \gamma1 \times c \quad (1)$$

$$DB = a2 \times a + \beta2 \times b + \gamma2 \times c \quad (2)$$

$$DC = a3 \times a + \beta3 \times b + \gamma3 \times c \quad (3)$$

Here, $\alpha1$ is a coefficient for a detected signal level a that is set depending on the incidence angle of the light ray from the point light source PA on the subject surface G1 to be restored at the position Pa on the imaging element 32.

$\beta1$ is a coefficient for a detected signal level b that is set depending on the incidence angle of the light ray from the point light source PB on the subject surface G1 to be restored at the position Pa on the imaging element 32.

$\gamma1$ is a coefficient for a detected signal level c that is set depending on the incidence angle of the light ray from the point light source PC on the subject surface G1 to be restored at the position Pa on the imaging element 32.

Therefore, ($\alpha1 \times a$) of the detected signal level DA indicates a detected signal level due to the light ray from the point light source PA at the position Pa.

Further, ($\beta1 \times b$) of the detected signal level DA indicates a detected signal level of the light ray from the point light source PB at the position Pa.

Further, ($\gamma1 \times c$) of the detected signal level DA indicates a detected signal level by the light ray from the point light source PC at the position Pa.

Therefore, the detected signal level DA is represented as a sum of multiplications of respective components of the point light sources PA, PB, and PC at the position Pa by respective coefficients $\alpha1$, $\beta1$, and $\gamma1$. Hereinafter, the coefficients $\alpha1$, $\beta1$, and $\gamma1$ are collectively referred to as a set of coefficients.

Similarly a set of coefficients $\alpha2$, $\beta2$, and $\gamma2$ for the detected signal level DB at the point light source Pb correspond to the set of coefficients $\alpha1$, $\beta1$, and $\gamma1$ for the detected signal level DA at the point light source PA, respectively. Further, a set of coefficients $\alpha3$, $\beta3$, and $\gamma3$ for the detected signal level DC at the point light source Pc corresponds to the set of coefficients $\alpha1$, $\beta1$, and $\gamma1$ for the detected signal level DA at the point light source Pa.

However, the detected signal levels of the pixels at the positions Pa, Pb, and Pc are values represented by a sum of products of the light intensities a, b, and c of the light rays emitted from the respective point light sources PA, PB, and PC, and the coefficients. Therefore, since each of the detected signal levels is a mixture of the light intensities a, b, and c of the light rays emitted from the respective point light sources PA, PB, and PC, the detected signal level is different from a formed image of a subject. An image formed from the detected signal levels DA, DB, and DC of the pixels at the positions Pa, Pb, and Pc corresponds to the modulated signal G2 in FIG. 1.

Specifically, the set of coefficients $\alpha1$, $\beta1$, and $\gamma1$, the set of coefficients $\alpha2$, $\beta2$, and $\gamma2$, the set of coefficients $\alpha3$, $\beta3$, and $\gamma3$, and the detected signal levels DA, DB, and DC are used to construct the simultaneous equations, these are solved for the light intensities a, b, and c, and pixel values of the respective positions Pa, Pb, and Pc are obtained as illustrated on the lower right side of FIG. 2. Accordingly a restored image (final image), which is a set of pixel values, is reconstructed and restored. This reconstructed image corresponds to an image G3 in FIG. 1.

When a distance between the imaging element 32 and the subject surface G1 illustrated on the upper left side of FIG. 2 is changed, the set of coefficients $\alpha1$, $\beta1$, and $\gamma1$, the set of coefficients $\alpha2$, $\beta2$, and $\gamma2$, the set of coefficients $\alpha3$, $\beta3$, and $\gamma3$ change accordingly. This change in sets of coefficients makes it possible to reconstruct the restored image (the final image) of the subject surfaces at various distances.

Therefore, it is possible to reconstruct images of the subject surface at various distances from an imaging position by changing the sets of coefficients to correspond to various distances through one imaging.

As a result, in the imaging using the imaging device 11 of FIG. 1, it is not necessary to be conscious of a so-called blurring phenomenon in which imaging is performed in a state in which a focus is shifted in imaging in an imaging device using a lens, and it is possible to reconstruct images of the subject surface at various distances after imaging by changing the sets of coefficients according to the distance as long as an image is captured in which a subject to be imaged within a field of view appears.

Figure 3:
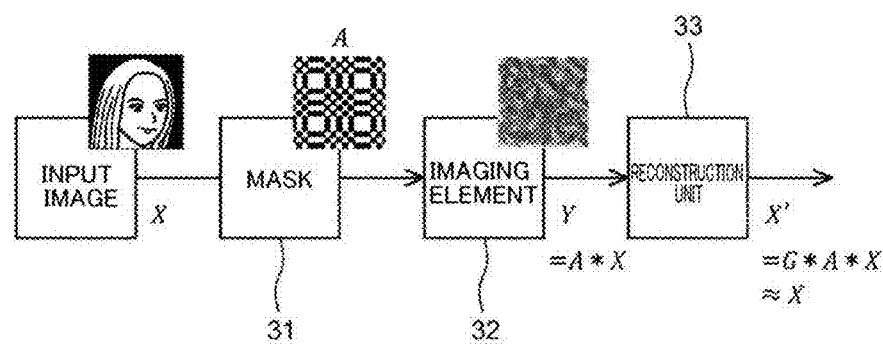
FIG. 3 is a diagram illustrating calculation processing by lensless imaging processing.

The detected signal levels illustrated on the upper right side of FIG. 2 are not the detected signal levels corresponding to the image in which an image of the subject is formed. Therefore, the detected signal levels are simple observed values, not pixel values, and an image formed of observed values corresponds to the modulated signal G2. The detected signal levels illustrated on the lower right side of FIG. 3 are signal values for respective pixels corresponding to the image in which the image of the subject is formed, that is, the values of the pixels of the restored image (the final image) restored based on the modulated signal G2, and are therefore pixel values. Thus, the restored image (the final image) on this subject surface G1 corresponds to the image G3.

With such a configuration, the imaging device 11 can function as a so-called lensless camera. As a result, since an imaging lens is not an essential component, it is possible to provide a low profile imaging device, that is, to reduce the thickness in an incidence direction of light in a configuration that implements an imaging function. Further, it is possible to reconstruct and restore the final image (the restored image) on the subject surface at various distances by variously changing the sets of coefficients.

Hereinafter, an image corresponding to the modulated signal G2 before reconstruction, captured by the imaging element 32, is simply referred to as a modulated image, and an image corresponding to the image G3, reconstructed and restored by the modulated image being subjected to signal processing, is referred to as a final image (a restored image). Therefore, from one modulated image, the images on the subject surface G1 at various distances can be reconstructed as the final image by variously changing the above-described sets of coefficients.

The reconstruction unit 33 includes the above-described sets of coefficients, and uses a set of coefficients according to the distance from the imaging position of the imaging device 11 to the subject surface G1 to reconstruct the final image (the restored image) (the image G3 in FIG. 1) based on the modulated image (the modulated signal G2 in FIG. 1) captured by the imaging element 32, and outputs the resulting image to the output unit 34.

The output unit 34 performs signal processing on the final image supplied from the reconstruction unit 33 and outputs the resulting image as an image signal.

<Relationship Between Mask and Imaging Element>

A series of processing performed by the imaging device 11 based on the above-described principle can be summarized as illustrated in FIG. 3.

Specifically, incident light forming an input image X corresponding to the subject surface G1 in FIG. 1 enters the mask 31, modulated by a pattern A of the mask 31, and captured by the imaging element 32.

The imaging element 32 captures the incident light in which the input image X corresponding to the subject surface G1 has been modulated by the pattern A of the mask 31 as a modulated image Y corresponding to the modulated signal G2 in FIG. 1, and outputs the modulated image Y to the reconstruction unit 33.

The reconstruction unit 33 performs signal processing on the modulated image Y to reconstruct a final image X' corresponding to the input image X, which corresponds to the final image G3 in FIG. 1.

In this series of processing in the imaging device 11, it is known that the modulated image Y corresponding to the modulated signal G2 captured by the imaging element 32 can be represented as a convolution of the pattern A of the mask 31 and the input image X, as represented in the following Equation (4).

$$Y = A * X \quad (4)$$

Here, Y is the modulated image captured by the imaging element 32 as illustrated in FIG. 3, A is a matrix expressing the pattern of the mask 31, X is the input image, and * represents the convolution operation.

Figure 4:
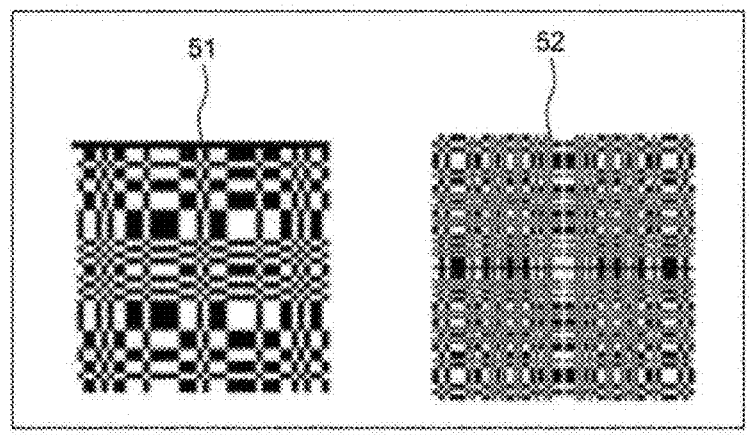
FIG. 4 illustrates examples of configurations of a URA mask and an MURA mask.

The pattern of the mask 31 represented as the matrix A is generally for example, a uniformly redundant arrays (URA) pattern 51 illustrated on the left side of FIG. 4 or a modified URA (MURA) pattern 52 illustrated on the right side of FIG. 4.

It is known that the autocorrelation function of each of the URA pattern 51 and the MURA pattern 52 is a δ function. By utilizing this feature, image reconstruction processing can be performed through convolution as represented in the following Equation (5), which makes it possible to perform a lightweight calculation through a fast Fourier transform (FFT).

$$X' = G * A * X = F^{-1}(F(G)F(A * X)) \quad (5)$$

Here, X' represents a reconstructed image corresponding to the reconstructed image G3 in FIG. 1, and G represents a restoration matrix (the inverse matrix of A) for the matrix of the pattern A of the mask 31.

Figure 5:
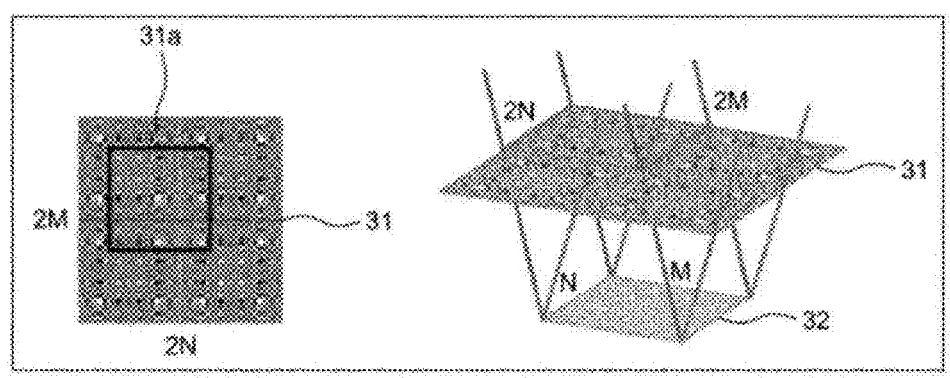
FIG. 5 illustrates the relationship in size between a mask and an imaging element.

When the URA pattern 51 and the MURA pattern 52 in FIG. 4 are used as the mask 31, it is necessary to form a pattern in which a reference pattern is repeated twice as illustrated in FIG. 5.

Specifically, FIG. 5 illustrates an example in which the imaging element 32 has a resolution size of N×M, while the mask 31 has a total resolution size of 2N×2M in which two mask regions 31a, each serving as a reference having a resolution size of N×M, which is the same size as the imaging element 32, are arranged in each of the horizontal and vertical directions.

For the imaging element 32 being prepared to have the same size as the reference pattern, it is possible to observe the result of convolution between the subject and the mask pattern within the field of view range defined by the distance between the imaging element 32 and the mask 31.

In other words, the mask 31 is configured to be twice as large as the imaging element 32 in each of the horizontal and vertical directions, thereby simplifying the processing of reconstruction.

<Plurality of Channels>

Incidentally in a technology having been proposed that configures object recognition processing using the functions of the lensless imaging device described above, generally processing of the first layer among processing of a deep neural network (DNN) multilayer hierarchy is processed in parallel by a plurality of channels, and subsequent object recognition is based on a plurality of feature vectors obtained in the respective channels.

Figure 6:
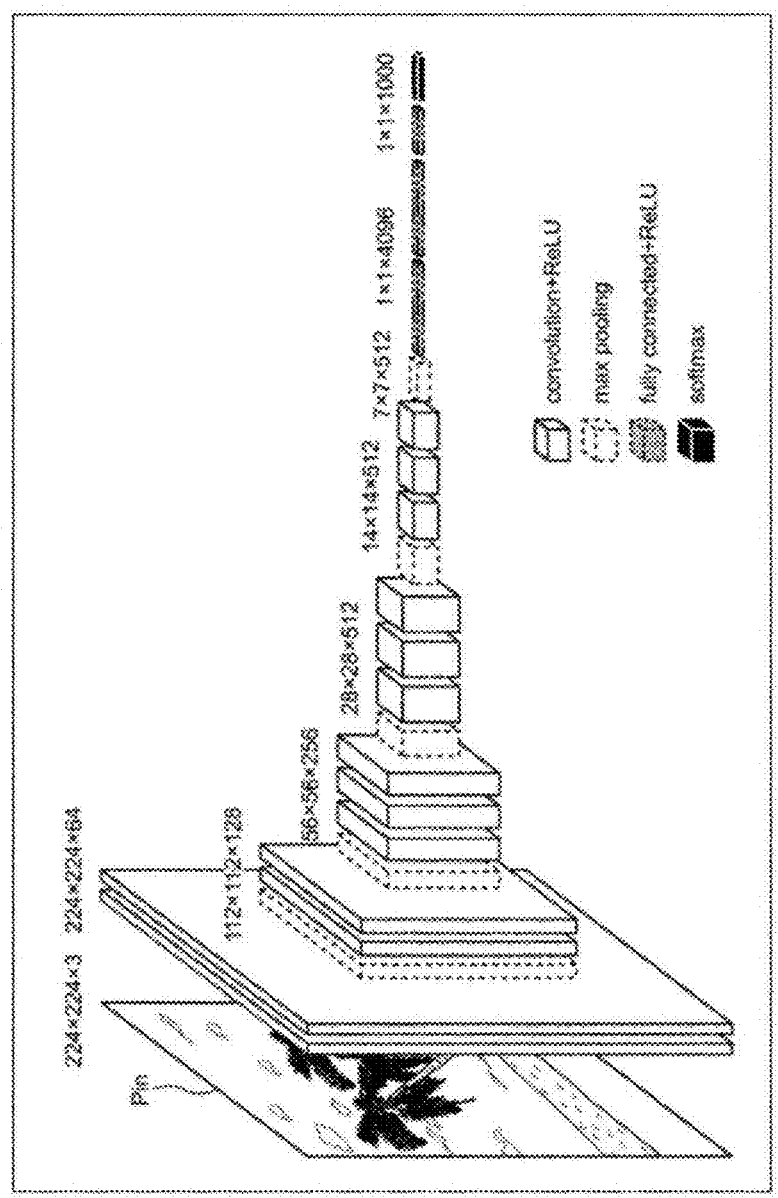
FIG. 6 illustrates object recognition processing using a DNN.

More specifically for example, when the object recognition processing using VGG16 used for an image recognition task is configured using a DNN, the DNN first layer processing is performed by a plurality of channels as illustrated in FIG. 6.

As illustrated in FIG. 6, when an image of three channels of RGB with 224×224 resolution is an input image Pin, a 64-channel convolution result is output through the processing of the first layer (224×224×64) (convolutional ReLU (Rectified Linear Unit)).

The layer is reduced to 112×112 resolution by Maxpooling using this result, followed by 128-channel convolution for 112×112 resolution (112×112×128). Subsequently, the layer is reduced to 56×56 resolution by Maxpooling using this result, followed by 256-channel convolution for 56×56 resolution (56×56×256).

Further, the layer is reduced to 28×28 resolution by Maxpooling using this result, followed by 512-channel convolution for 28×28 resolution (28×28×512).

Further, the layer is reduced to 14×14 resolution by Maxpooling using this result, followed by 512-channel convolution for 14×14 resolution (14×14×512).

Further, the layer is reduced to 7×7 resolution by Maxpooling using this result, and 512-channel convolution is performed for 7×7 resolution (7×7×512).

Thereafter, a determination result (fully connected+ReLU) (1×1×4096) of the feature vector is generated based on a result of the 512-channel convolution (7×7×512) with this 7×7 resolution.

A probability function (softmax) based on the feature vector determination result (fully connected+ReLU) (1×1×4096) is output as the recognition result.

Therefore, for a multi-channel convolution, each of the mask 31 and the imaging element 32 is divided into a plurality of sub-areas for each channel, and processing of image reconstruction is performed for each sub-area.

As described above, for convolution-based restoration processing to be performed, it is necessary to prepare the mask 31 that is twice as large as the imaging element 32 in both length and width.

Figure 7:
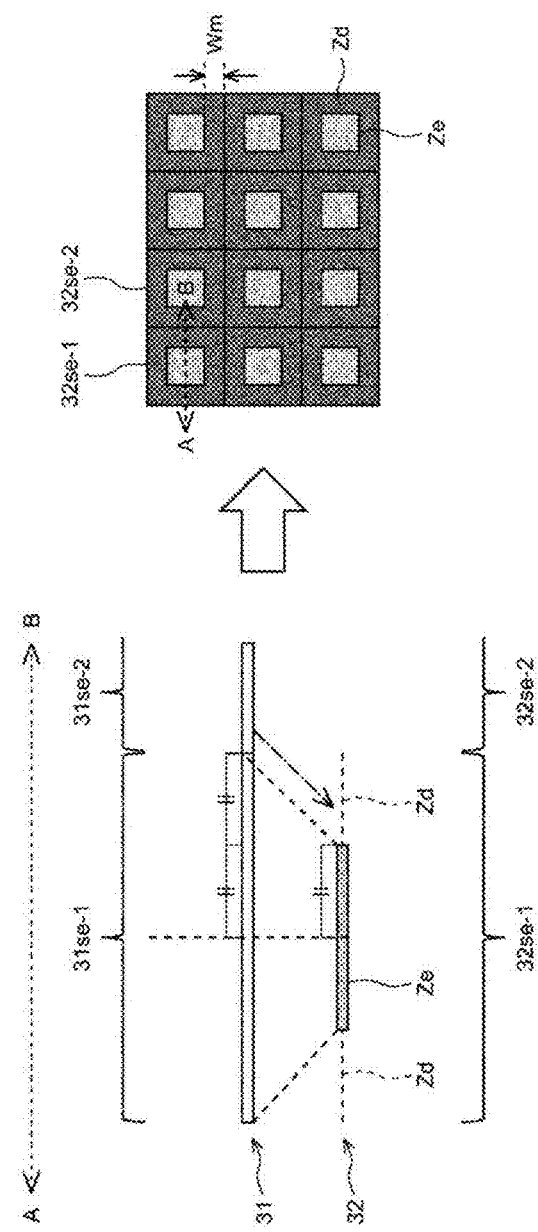
FIG. 7 illustrates a margin region and an effective region that are set for the imaging element.

Incidentally in a case where the mask 31 and the imaging element 32 are divided into a plurality of sub-areas 31se and a plurality of sub-areas 32se, respectively in order to prevent modulated light to intrude into a sub-area from sub-areas 31se adjacent thereto, it is necessary to set an effective region Ze used for imaging near the center of each sub-area 32se on the imaging element 32 side, and set a margin region Zd that does not contribute to imaging in between the sub-area 32se and sub-areas 32se adjacent thereto, as illustrated in FIG. 7.

Specifically as illustrated on the left side of FIG. 7, on a margin region Zd of a sub-area 32se-1 on the imaging element 32, modulated light from a sub-area 31se-2 of the mask 31 that is adjacent thereto may be incident as indicated by a dashed arrow. This may cause noise when reconstructing the image, so that the margin region Zd cannot be considered as an effective region Ze.

Thus, on the imaging element 32, the margin region Zd that does not contribute to imaging (is never used for imaging) is set near the boundary between adjacent sub-areas 32se-1 and 32se-2, for example, with a width Wm, in order to limit the effective region Ze on the imaging element 32. Such a configuration may reduce the area utilization efficiency of the imaging element 32, resulting in a deterioration in the quality of the reconstructed image.

An AB cross section of one sub-area in the mask 31 and the imaging element 32 illustrated on the right side of FIG. 7 is illustrated on the left side of FIG. 7, and a top view of the imaging element 32 is illustrated on the right side of FIG. 7, in which illustrated are the sub-areas 31se-1 and 31se-2 on the mask 31 and the margin region Zd and effective region Ze of the sub-area 32se-1 among their corresponding sub-areas 32se-1 and 32se-2 on the imaging element 32.

Therefore, in the present disclosure, the mask 31 is structured so that the sub-areas are arranged to spatially overlap, while adjacent sub-areas are optically perpendicular to each other, that is, they can perform conversion into modulated light with different optical characteristics. On the other hand, for each sub-area, a filter that allows only the modulated light having corresponding optical characteristics to pass through toward the imaging element 32 is disposed on the imaging element 32 in front of the imaging element 32.

This prevents the intrusion of modulated light into a sub-area from other sub-areas adjacent thereto, and therefore reduce the margin region to be set on the imaging element 32 can be reduced, thereby improving the area utilization efficiency of the imaging element 32 and thus improving the image quality of the final reconstructed image.

Furthermore, it is possible to structure the mask 31 so that the sub-areas are arranged to spatially overlap, and it is also possible to arrange the filters configured on the imaging element 32 for the respective sub-areas without requiring the margin region Zd described above. This makes it possible to reduce the sizes of the mask 31 and the imaging element 32 while maintaining the image quality of the final reconstructed image.

2. Preferred Embodiment

<Configuration Example of Lensless Imaging Device of Present Disclosure>

Next, a configuration example of an imaging device including a lensless camera, according to the present disclosure will be described with reference to FIG. 8.

Figure 8:
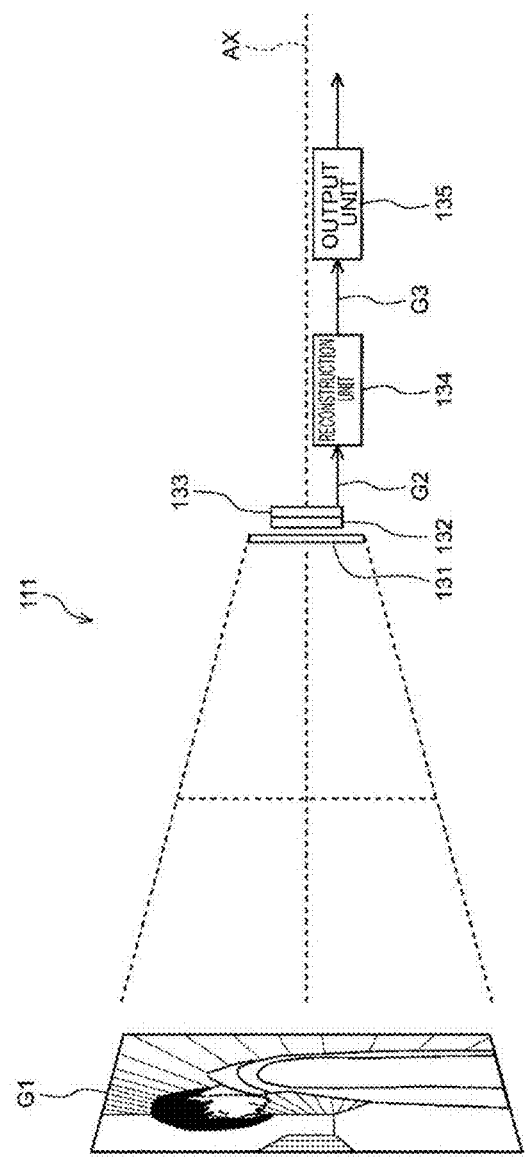
FIG. 8 illustrates a configuration example of an imaging device according to the present disclosure.

The imaging device 111 of FIG. 8 is a lensless camera, similar to the imaging device 11 of FIG. 1, and includes a sub-area optical characteristic conversion modulation mask 131, a sub-area selection transmission filter 132, an imaging element 133, a reconstruction unit 134, and an output unit 135.

In addition, the configurations of the imaging element 133, the reconstruction unit 134, and the output unit 135 basically have functions corresponding to those of the imaging element 32, the reconstruction unit 33, and the output unit 34 in the imaging device 11 of FIG. 1, and thus, their description will be omitted as appropriate.

In other words, the imaging device 111 of FIG. 8 differs from the imaging device 11 of FIG. 1 in that the sub-area optical characteristic conversion modulation mask 131 is provided instead of the mask 31, and the sub-area selection transmission filter 132 is provided in front of the imaging element 133.

In addition, in the imaging device 111, each of the sub-area optical characteristic conversion modulation mask 131 and the imaging element 133 is divided into their corresponding sub-areas, and the reconstruction unit 134 performs processing of reconstructing an image by parallel processing for each sub-area.

The sub-areas are formed in square shapes as their corresponding regions into which each of the sub-area optical characteristic conversion modulation mask 131, the sub-area selection transmission filter 132, and the imaging element 133 is divided. The size of the sub-area optical characteristic conversion modulation mask 131 is twice the size of the sub-area selection transmission filter 132 in each of the horizontal and vertical directions, and the same size relationship applies to the sub-areas accordingly.

Therefore, the modulated light for each sub-area set on the sub-area optical characteristic conversion modulation mask 131 passes through a sub-area filter, of the sub-area selection transmission filter 132 on the imaging element 133, which allows only the modulated light having the corresponding optical characteristics to pass through, and is captured as a modulated image by the imaging element 133.

The reconstruction unit 134 performs the processing of reconstructing a final image from the modulated image in parallel for each sub-area, combines the results of processing for the respective sub-areas, and outputs the combined result to the output unit 135 as a final image.

As described with reference to FIG. 6, in object recognition processing performed based on a modulated image captured using the configuration of the imaging device 111, the reconstruction unit 134 performs processing for obtaining a feature vector required for the object recognition processing for each sub-area in parallel processing, and then the object recognition processing is performed based on the feature vector for each sub-area.

<Sub-Area Optical Characteristic Conversion Mask and Sub-Area Selection Transmission Filter>

The sub-area optical characteristic conversion modulation mask 131 is a mask that converts incident light into modulated light having different optical characteristics that are orthogonal to each other between adjacent sub-areas.

The sub-area selection transmission filter 132 includes filters that are attached onto the imaging element 133 and that select modulated light having optical characteristics that are orthogonal to each other between adjacent sub-areas, which are preset for each sub-area, to allow the modulated light to pass through toward the imaging element 133.

The sub-area optical characteristic conversion modulation mask 131 and the sub-area selection transmission filter 132 are associated with each other with a sub-area set as a unit. Specifically, as illustrated in FIG. 9, sub-area masks 131a to 131d of the sub-area optical characteristic conversion modulation mask 131, and filters 132a to 132d for their corresponding sub-areas set in the sub-area selection transmission filter 132 on the imaging element 133 are associated with each other.

Figure 9:
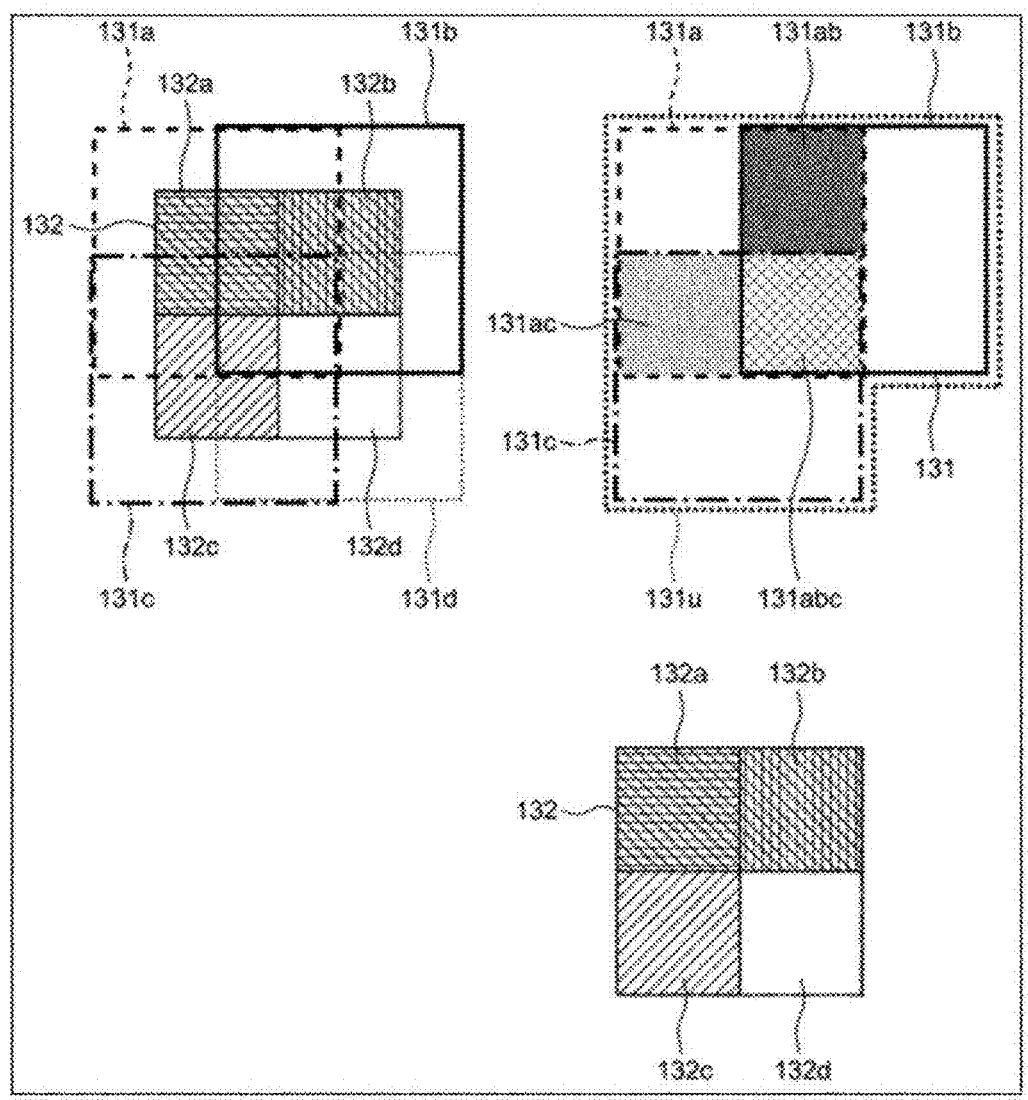
FIG. 9 illustrates a configuration example of a sub-area optical characteristic conversion modulation mask and a sub-area selection transmission filter.

FIG. 9 illustrates an example in which the sub-area optical characteristic conversion modulation mask 131 and the sub-area selection transmission filter 132 are configured by the four types of sub-area masks 131a to 131d and the filters 132a to 132d, which correspond to 2×2 sub-areas, respectively.

More specifically, as illustrated in FIG. 9, the sub-area optical characteristic conversion modulation mask 131 and the sub-area selection transmission filter 132 are arranged so that the central positions of the sub-area masks 131a to 131d coincide with the central positions of the filters 132a to 132d, respectively; the sub-area masks 131a to 131c are arranged so that they partially overlap with each other; and the filters 132a to 132d are arranged in a matrix.

On the upper left side of FIG. 9, an arrangement is illustrated in which the sub-area optical characteristic conversion modulation mask 131 and the sub-area selection transmission filter 132 overlap with each other as viewed from the incident direction of the incident light.

The illustrated arrangement of the sub-area masks 131a to 131d of the sub-area optical characteristic conversion modulation mask 131 is a theoretical example, and does not represent the actual physical structure.

However, the explanation of the sub-area masks 131a to 131d herein is continued without distinguishing between their physical structure and logical structure, and the actual physical structure of the sub-area optical characteristic conversion modulation mask 131 will be described in detail later with reference to FIGS. 13 to 16.

On the other hand, the filters 132a to 132d are illustrated with the actual physical structure.

On the upper right side of FIG. 9, an arrangement is illustrated in which only the sub-area masks 131a to 131c of the sub-area optical characteristic conversion modulation mask 131 illustrated on the upper left side of FIG. 9 are extracted, and on the lower right side, an actual physical arrangement is illustrated in which only the filters 132a to 132d of the sub-area selection transmission filter 132 illustrated on the upper left side are extracted.

The sub-area masks 131a to 131d and the filters 132a to 132d have sizes corresponding to the sub-areas 31se on the mask 31 and the sub-areas 32se on the imaging element 32, respectively, which have been described with reference to FIG. 7.

Specifically, the vertical and horizontal sizes of each of the sub-area masks 131a to 131d are twice the vertical and horizontal sizes of each of the filters 132a to 132d. The sub-areas 31se on the mask 31, which have been described with reference to FIG. 7, are illustrated with the actual physical structure.

The sub-area masks 131a to 131d of the sub-area optical characteristic conversion modulation mask 131 convert the incident light for their respective sub-areas into incident light having four types of orthogonal optical characteristics, further modulate the resulting light using their respective mask patterns, and allow the light to enter the corresponding regions of the imaging element 133 via their respective filters 132a to 132d on the sub-area selection transmission filter 132.

The filters 132a to 132d on the sub-area selection transmission filter 132 allow modulated light having the four types of orthogonal optical characteristics, which have been converted by passing through their corresponding sub-area masks 131a to 131d of the sub-area optical characteristic conversion modulation mask 131, to pass through and then enter the corresponding regions of the imaging element 133.

However, since the region on the imaging element 133 corresponding to the filter 132d needs to be set in a margin region, the filter 132d may allow incident light having any optical characteristics to pass through.

Therefore, in reality, the sub-area selection transmission filter 132 is a filter in which only the filters 132a to 132c among the filters 132a to 132d are enabled, and allows modulated light having three different types of orthogonal optical characteristics to pass through and then enter the imaging element 133.

The different orthogonal optical characteristics are set, for example, as a combination of two types of optical characteristics with separation axes of polarization and spectroscopy.

For example, as illustrated in FIG. 10, four orthogonal types of optical characteristics can be set by utilizing two types of optical characteristics with separation axes of polarization and spectroscopy to combine light polarized in the vertical direction (vertically polarized light), light polarized in the horizontal direction (horizontally polarized light), blue spectral light (Blue), and red spectral light (Red).

Specifically, by combining vertically polarized light and blue spectral light, optical characteristics of Type A can be set with a vertically polarized component and a blue spectral component.

By combining horizontally polarized light and blue spectral light, optical characteristics of Type B can be set with a horizontally polarized component and a blue spectral component.

By combining vertically polarized light and red spectral light, optical characteristics of Type C can be set with a vertically polarized component and a red spectral component.

By combining horizontally polarized light and red spectral light, optical characteristics of Type D can be set with a horizontally polarized component and a blue spectral component.

In the present embodiment, since it is sufficient to be able to classify the light into three orthogonal optical characteristics as described above, the filter 132a is a combination of a blue spectral filter and a transverse polarization filter (horizontal polarization filter), and allows only incident light having optical characteristics of a blue spectral component and a horizontally polarized component, among the incident light that enters the corresponding region, to pass through toward the imaging element 133.

The filter 132b is a combination of a blue spectral filter and a longitudinal polarization filter (vertical polarization filter), and allows only incident light having optical characteristics of a blue spectral component and a vertically polarized component, among the incident light that enters the corresponding region, to pass through toward the imaging element 133.

The filter 132c is a red spectral filter, and allows only incident light having optical characteristics of an unpolarized, red spectral component, among the incident light that enters the corresponding region, to pass through toward the imaging element 133.

In the filters 132a to 132c in FIG. 9, the polarization characteristics and the spectral characteristics are represented according to the direction of the striped pattern: for a striped pattern with stripes vertically oriented, it represents a vertical polarization filter, and for a striped pattern with stripes horizontally oriented, it represents a horizontal polarization filter. Similarly for a striped pattern with stripes sloping downward to the right, it represents a blue spectral filter, and for a striped pattern with stripes sloping upward to the right, it represents a red spectral filter.

When a polarization filter and a spectral filter are combined, their striped patterns are represented as their overlap. Specifically the filter 132a is a combination of a blue spectral filter and a horizontal polarization filter, and thus a horizontal striped pattern and a right-downward striped pattern are represented as their combination.

The filter 132b is a combination of a blue spectral filter and a vertical polarization filter, and thus a vertical striped pattern and a right-downward striped pattern are represented as their combination. The filter 132c is a red spectral filter without a polarization filter, and is thus represented as a right-upward striped pattern.

The sub-area masks 131a to 131c for their respective sub-areas of the sub-area optical characteristic conversion modulation mask 131 convert the incident light into modulated light having three types of optical characteristics that are optically orthogonal to each other for the sub-areas.

As a result, the modulated light converted by each of the sub-area masks 131a to 131c can pass through only the corresponding one of the filters 132a to 132c on the sub-area selection transmission filter 132, and is captured as a modulated image by the imaging element 133.

The sub-area mask 131d is for the filter 132d set in the margin region, and therefore does not need to be enabled. However, it needs to have a structure that does not interfere with the functions of the sub-area masks 131a to 131c, and therefore, its entire surface is configured so as not to polarize or disperse light, and is represented by a fine dotted line in the figure.

The sub-area masks 131a to 131c of the sub-area optical characteristic conversion modulation mask 131 are arranged so that their respective central positions coincide with the corresponding central positions of the filters 132a to 132c on the sub-area selection transmission filter 132.

Therefore, in FIG. 9, the right half of the sub-area mask 131a indicated by the dotted line and the left half of the sub-area mask 131b indicated by the solid line are arranged in an overlapping state.

In FIG. 9, the lower half of the sub-area mask 131a indicated by the dotted line and the upper half of the sub-area mask 131c indicated by the dashed line are arranged in an overlapping state.

With this arrangement, the lower right ¼ of the sub-area mask 131a indicated by the dotted line, the lower left ¼ of the sub-area mask 131b indicated by the solid line, and the upper right ¼ of the sub-area mask 131c indicated by the dashed line are arranged in an overlapping state.

As a result, on the upper right side of FIG. 9, the upper right ¼ region of the sub-area mask 131a and the upper left ¼ region of the sub-area mask 131b overlap with each other to form an overlapping region 131ab represented in dark gray in the figure.

Further, the lower left ¼ region of the sub-area mask 131a and the upper left ¼ region of the sub-area mask 131c overlap with each other to form an overlapping region 131ac represented in light gray in the figure.

Furthermore, the lower right ¼ region of the sub-area mask 131a, the lower left ¼ region of the sub-area mask 131b, and the upper right ¼ region of the sub-area mask 131c overlap with each other to form an overlapping region 131abc represented by a grid pattern in the figure.

The overlapping regions 131ab, 131ac, and 131abc have approximately the same size as the filters 132a to 132c of the sub-area selection transmission filter 132, respectively.

Hereinafter, a part where the sub-area masks 131a to 131c surrounded by a fine dotted line on the upper right side of FIG. 9 are defined will be referred to as a sub-area mask unit 131u.

The sub-area masks 131a to 131c, even in the state of overlapping each other, allow the incident light that has passed through them to be converted in the regions of their corresponding filters 132a to 132c into modulated light having optical characteristics that allow the light to pass through toward the imaging element 133.

Figure 11:
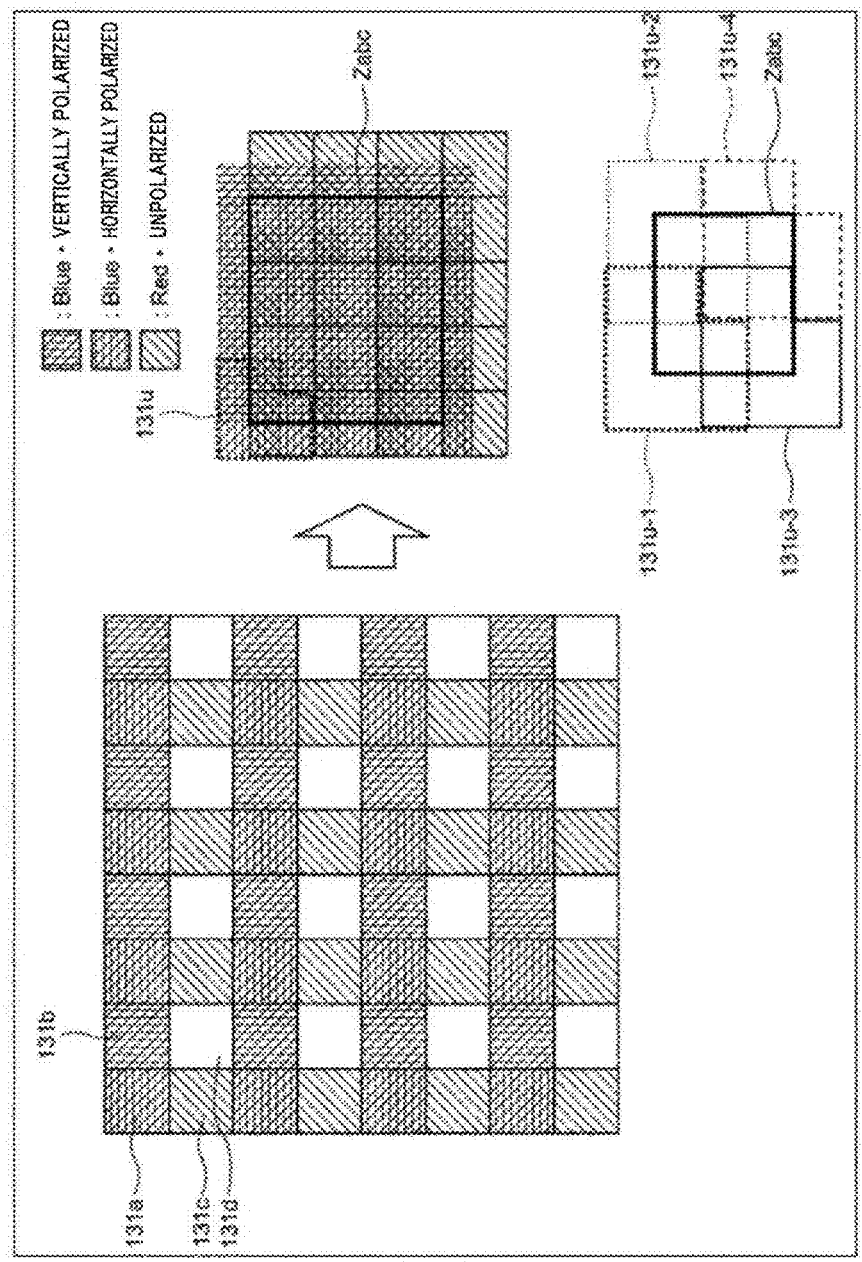
FIG. 11 illustrates an example of arrangement of sub-area masks in the sub-area optical characteristic conversion modulation mask.

If a margin region is set in the conventional manner as illustrated on the right side of FIG. 7, the sub-area masks 131a to 131c of the sub-area optical characteristic conversion modulation mask 131 are arranged as illustrated on the left side of FIG. 11.

In FIG. 11, the regions in which the sub-area masks 131a to 131c are formed are represented by striped patterns similar to the striped patterns that represent the optical characteristics that allow light to pass through their corresponding filters 132a to 132c of the sub-area selection transmission filter 132.

However, each of the regions in which the sub-area masks 131a to 131c are formed is where a mask pattern corresponding to the transmission region 41 or the light-blocking region 42 in FIG. 2 is actually formed for each of the finer light transmission/blocking adjustment regions described below, and thus filters with the striped patterns illustrated in the figure are not formed.

In other words, the striped patterns representing the sub-area masks 131a to 131c in FIG. 11 only represent the relationship with their corresponding filters 132a to 132c of the sub-area selection transmission filter 132.

Specifically, on the left side of FIG. 11, the sub-area mask 131b is formed to the right of a sub-area mask 131a, and the sub-area mask 131c is formed below the sub-area mask 131a.

The sub-area mask 131d is for the filter 132d of the sub-area selection transmission filter 132, which is treated as a margin region as described above, and is thus represented in white.

The sub-area optical characteristic conversion modulation mask 131 has a configuration in which the sub-area masks 131a to 131d are repeatedly arranged in the horizontal and vertical directions. In the figure, only the sub-area masks 131a to 131d are labeled with reference numerals, and reference numerals for the other configurations are omitted. The configuration similar to the sub-area masks 131a to 131d is repeatedly arranged in the horizontal and vertical directions in the same arrangement.

However, as described with reference to the upper right side of FIG. 9, the sub-area optical characteristic conversion modulation mask 131 of the present disclosure has a structure in which each of the sub-area masks 131a to 131c is enabled when the sub-area masks 131a to 131c are arranged in an overlapping state. However, since the sub-area masks 131a to 131c do not work properly even if they physically overlap, the physical structure will be described separately later, and its theoretical configuration will now be described.

Specifically, as illustrated on the lower right side of FIG. 11, the sub-area optical characteristic conversion modulation masks 131 are arranged with the sub-area mask unit 131*u* set as a unit in a manner that they overlap by approximately the same size as each of the filters 132*a* to 132*c* of the sub-area selection transmission filter 132 in the horizontal and vertical directions.

With this arrangement, in the sub-area optical characteristic conversion modulation mask 131 as illustrated on the upper right side of FIG. 11, almost the entire region indicated by a region Zabc has a structure in which the three filters 132*a* to 132*c* overlap, except that overlapping regions 131*ab* and 131*ac* are formed at the ends of the entire mask.

On the lower right side of FIG. 11, sub-area mask units 131*u*-1 to 131*u*-4 are illustrated that are arranged to overlap with each other in the horizontal and vertical directions by approximately the same size as the filters 132*a* to 132*c* of the sub-area selection transmission filter 132.

Thus, in the sub-area optical characteristic conversion modulation mask 131, the overlapping regions 131*abc* in FIG. 9, where the sub-area masks 131*a* to 131*c* overlap with each other, are formed on almost the entire surface, except for the ends.

On the other hand, if a margin region is set in the conventional manner as described with reference to the right side of FIG. 7, the filters 132*a* to 132*d* of the sub-area selection transmission filter 132 are arranged as illustrated on the left side of FIG. 12.

Specifically, the filter 132*b* is formed to the right of filter 132*a* across the margin region Zd represented in white, and the filter 132*c* is formed below the filter 132*a* across the margin region.

As described above, the filter 132*d* is treated as a margin region, and is therefore represented in the same white as the margin region. The sub-area selection transmission filter 132 has a configuration in which the filters 132*a* to 132*d* are repeatedly arranged in the horizontal and vertical directions.

However, in the present disclosure, as described with reference to FIG. 11, the sub-area masks 131*a* to 131*c* of the sub-area optical characteristic conversion modulation mask 131 are arranged in an overlapping state.

Figure 12:
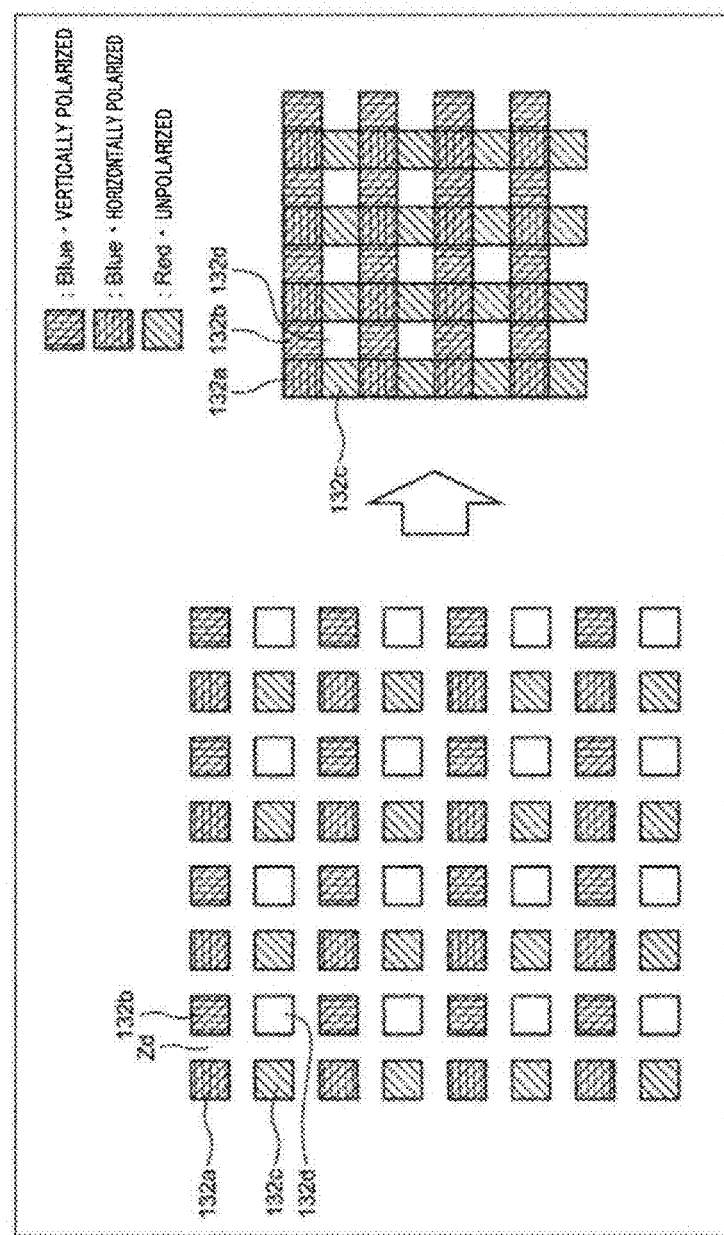
FIG. 12 illustrates an example of arrangement of filters constituting the sub-area selection transmission filter.

Thus, the filters 132*a* to 132*d* of the sub-area selection transmission filter 132 are arranged with their respective central positions coinciding with the central positions of the sub-area masks 131*a* to 131*c*, and therefore are arranged in a dense state as illustrated on the right side of FIG. 12, with only the filter 132*d* being set in the margin region.

As a result, the margin region in the imaging element 133 can be made to have a size equivalent to that of the filter 132*d*, thereby improving the area utilization efficiency.

<Physical Configuration Example of Sub-Area Optical Characteristic Conversion Modulation Mask>

Next, a physical configuration example of the overlapping region of the sub-area masks 131*a* to 131*c* of the sub-area optical characteristic conversion modulation mask 131 will be described.

As described above, the sub-area masks 131*a* to 131*c* of the sub-area optical characteristic conversion modulation mask 131 need to theoretically form the overlapping region 131*abc* where the three sub-area masks 131*a* to 131*c* overlap with each other.

Accordingly even in the overlapping region 131*abc*, the sub-area masks 131*a* to 131*c* need to generate modulated light having orthogonal optical characteristics that allow the light to pass through only the corresponding filters 132*a* to 132*c*.

As described with reference to FIG. 2, in the mask 31, the transmission regions 41 or the light-blocking regions 42 are arranged in a predetermined pattern so as to modulate the incident light. The arrangement pattern of the transmission regions 41 and the light-blocking regions 42 on the mask 31 is what is called the mask pattern of the mask 31.

Hereinafter, the minimum region where the transmission region 41 or the light-blocking region 42 is formed, where the mask pattern of the mask 31 is formed of the regions, will be referred to as a light transmission/blocking adjustment region. That is, in the mask 31 in FIG. 1, a mask pattern is formed with a configuration corresponding to the transmission regions 41 or the light-blocking regions 42 in FIG. 2, with the light transmission/blocking adjustment region set as a unit.

In the overlapping region 131*abc*, the light transmission/blocking adjustment regions constituting the mask pattern needs to function as three sub-area masks 131*a* to 131*c*.

Specifically, each of the light transmission/blocking adjustment regions in the overlapping region 131*abc* needs to function as the sub-area mask 131*a* for incident light to pass through the filter 132*a* and to enter the imaging element 133 among incident light, function as the sub-area mask 131*b* for incident light to pass through the filter 132*b* and to enter the imaging element 133 among incident light, and function as the sub-area mask 131*c* for incident light to pass through filter 132*c* and to enter the imaging element 133 among incident light.

The filter 132*a* allows only light having optical characteristics of a blue spectral component and a vertically polarized component to pass through, the filter 132*b* allows only light having optical characteristics of a blue spectral component and a horizontally polarized component to pass through, and the filter 132*c* allows only light of an unpolarized, red spectral component to pass through.

Accordingly each of the light transmission/blocking adjustment regions in the overlapping region 131*abc* needs to function as the sub-area mask 131*a* that converts the incident light to pass through the filter 132*a* and to enter the imaging element 133 into modulated light having optical characteristics of a blue spectral component and a horizontally polarized component.

Hereinafter, modulated light having optical characteristics of a blue spectral component and a horizontally polarized component will be simply referred to as horizontally polarized blue light (blue and horizontally polarized light).

Each of the light transmission/blocking adjustment regions in the overlapping region 131*abc* needs to function as the sub-area mask 131*b* that converts the incident light to pass through the filter 132*b* and to enter the imaging element 133 into modulated light having optical characteristics of a blue spectral component and a vertically polarized component.

Modulated light having optical characteristics of a blue spectral component and a vertically polarized component will be simply referred to as vertically polarized blue light (blue and vertically polarized light).

Each of the light transmission/blocking adjustment regions in the overlapping region 131*abc* needs to function as the sub-area mask 131*c* that converts the incident light to pass through the filter 132*c* and to enter the imaging element 133 into modulated light having optical characteristics of an unpolarized, red spectral component.

Modulated light having optical characteristics of red spectral incident light with no polarization condition will be also simply referred to as unpolarized red light (red and unpolarized light).

Therefore, for the light transmission/blocking adjustment regions in the overlapping region 131*abc* of the sub-area optical characteristic conversion modulation mask 131, a filter in which a red spectral filter, a blue spectral filter, a vertical polarization filter, and a horizontal polarization filter are combined is set so that the regions function as a mask in which the sub-area masks 131*a* to 131*c* overlap with each other.

Specifically, as illustrated in the top row in FIG. 13, for example, in order for a light transmission/blocking adjustment region in the overlapping region 131*abc* of the sub-area optical characteristic conversion modulation mask 131 to function as a transmission region for all of the sub-area masks 131*a* to 131*c*, it is necessary to apply a filter that allows horizontally polarized blue light, vertically polarized blue light, and unpolarized red light to pass through, so that the transmission region is set to have, for example, a non-spectral, non-polarization filter or a simple opening.

On the left side of FIG. 13, combinations are represented of the light transmission/blocking adjustment regions for the sub-area masks 131*a* to 131*c* to each function as a transmission region or a light-blocking region; to function as a transmission region, it is represented by a white square, and to function as a light-blocking region, it is represented by a black square.

On the right side of FIG. 13, types of filters are represented to be applied in the light transmission/blocking adjustment regions on the overlapping region 131*abc*, which are set depending on the combinations of the light transmission/blocking adjustment regions for the sub-area masks 131*a* to 131*c* to each function as a transmission region or a light-blocking region, which are represented on the left side. The filter pattern on the right side of FIG. 13 is represented in the same manner as the patterns of the filters 132*a* to 132*c* of the sub-area selection transmission filter 132 in FIG. 12.

Specifically, for the light transmission/blocking adjustment regions on the overlapping region 131*abc*, where each of the light transmission/blocking adjustment regions of the sub-area masks 131*a* to 131*c* functions as a transmission region, it is necessary to transmit horizontally polarized blue light, vertically polarized blue light, and unpolarized red light, as illustrated in the top row on the left side in FIG. 13.

In such a case, a non-polarization and non-spectral filter (or an opening without a filter (white square)) is formed in the light transmission/blocking adjustment regions on the overlapping region 131*abc*, as illustrated in the top row on the right side of FIG. 13.

For the light transmission/blocking adjustment regions on the overlapping region 131*abc*, where each of the light transmission/blocking adjustment regions of the sub-area masks 131*a* and 131*b* functions as a transmission region and the light transmission/blocking adjustment region of the sub-area masks 131*c* functions as a light-blocking region, it is necessary to transmit horizontally polarized blue light and vertically polarized blue light and to block unpolarized red light, as illustrated in the second row on the left side in FIG. 13.

In such a case, a blue spectral filter is formed in the light transmission/blocking adjustment regions on the overlapping region 131*abc*, as illustrated in the second row on the right side of FIG. 13.

For the light transmission/blocking adjustment regions on the overlapping region 131*abc*, where each of the light transmission/blocking adjustment regions of the sub-area masks 131*a* and 131*c* functions as a transmission region and the light transmission/blocking adjustment region of the sub-area masks 131*b* functions as a light-blocking region, it is necessary to transmit horizontally polarized blue light and unpolarized red light and to block vertically polarized blue light, as illustrated in the third row on the left side in FIG. 13.

In such a case, a horizontal polarization filter is formed in the light transmission/blocking adjustment regions on the overlapping region 131*abc*, as illustrated in the third row on the right side of FIG. 13.

For the light transmission/blocking adjustment regions on the overlapping region 131*abc*, where the light transmission/blocking adjustment region of the sub-area masks 131*a* functions as a transmission region and each of the light transmission/blocking adjustment regions of the sub-area masks 131*b* and 131*c* functions as a light-blocking region, it is necessary to transmit horizontally polarized blue light and to block vertically polarized blue light and unpolarized red light, as illustrated in the fourth row on the left side in FIG. 13.

In such a case, a filter in which a horizontal polarization filter and a blue spectral filter are combined is formed in the light transmission/blocking adjustment regions on the overlapping region 131*abc*, as illustrated in the fourth row on the right side of in FIG. 13.

For the light transmission/blocking adjustment regions on the overlapping region 131*abc*, where each of the light transmission/blocking adjustment regions of the sub-area masks 131*b* and 131*c* functions as a transmission region and the light transmission/blocking adjustment region of the sub-area masks 131*a* functions as a light-blocking region, it is necessary to transmit vertically polarized blue light and unpolarized red light and to block horizontally polarized blue light, as illustrated in the fifth row on the left side in FIG. 13.

In such a case, a vertical polarization filter is formed in the light transmission/blocking adjustment regions on the overlapping region 131*abc*, as illustrated in the fifth row on the right side of FIG. 13.

For the light transmission/blocking adjustment regions on the overlapping region 131*abc*, where the light transmission/blocking adjustment region of the sub-area masks 131*b* functions as a transmission region and each of the light transmission/blocking adjustment regions of the sub-area masks 131*a* and 131*c* functions as a light-blocking region, it is necessary to transmit vertically polarized blue light and to block horizontally polarized blue light and unpolarized red light, as illustrated in the sixth row on the left side in FIG. 13.

In such a case, a filter in which a vertical polarization filter and a blue spectral filter are combined is formed in the light transmission/blocking adjustment regions on the overlapping region 131*abc*, as illustrated in the sixth row on the right side of in FIG. 13.

For the light transmission/blocking adjustment regions on the overlapping region 131*abc*, where the light transmission/blocking adjustment region of the sub-area masks 131*c* functions as a transmission region and each of the light transmission/blocking adjustment regions of the sub-area masks 131*a* and 131*b* functions as a light-blocking region, it is necessary to transmit unpolarized red light and to block horizontally polarized blue light and vertically polarized blue light, as illustrated in the seventh row on the left side in FIG. 13.

In such a case, a red spectral filter is formed in the light transmission/blocking adjustment regions on the overlapping region 131abc, as illustrated in the seventh row on the right side of FIG. 13.

For the light transmission/blocking adjustment regions on the overlapping region 131abc, where each of the light transmission/blocking adjustment regions of the sub-area masks 131a to 131c functions as a light-blocking region, it is necessary to block horizontally polarized blue light, vertically polarized blue light, and unpolarized red light, as illustrated in the bottom row on the left side in FIG. 13.

In such a case, a light-blocking region 42 is formed in the light transmission/blocking adjustment regions on the overlapping region 131abc, as illustrated in the bottom row on the right side of FIG. 13.

<Specific Configuration Example of Sub-Area Optical Characteristic Conversion Modulation Mask>

Next, a specific configuration example of the sub-area optical characteristic conversion modulation mask 131 will be described with reference to FIGS. 14 and 15. Almost the entire sub-area optical characteristic conversion modulation mask 131 is the overlapping region 131abc where the sub-area masks 131a to 131c overlap with each other, and thus a specific example of a filter formed in the light transmission/blocking adjustment regions on the overlapping region 131abc will be described.

Figure 14:
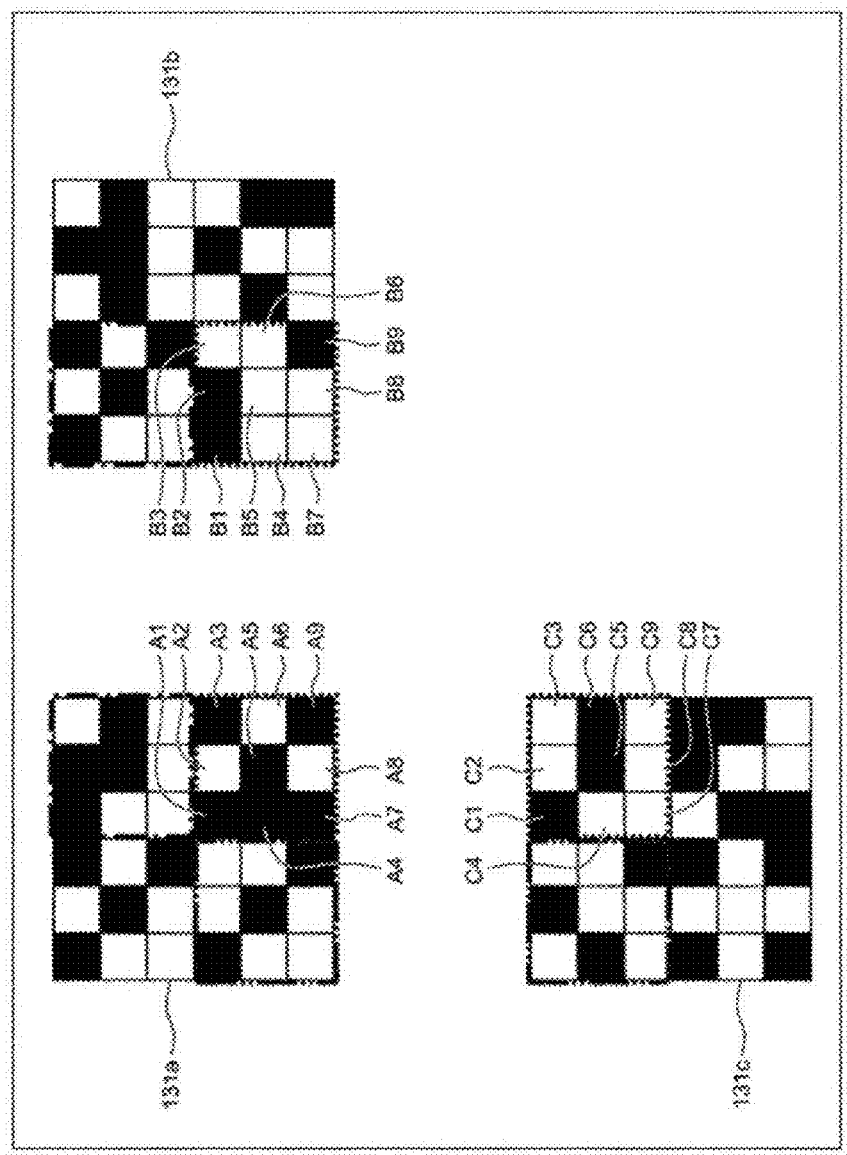
FIG. 14 illustrates an example of setting light transmission/blocking adjustment regions for specific sub-area masks.
Figure 15:
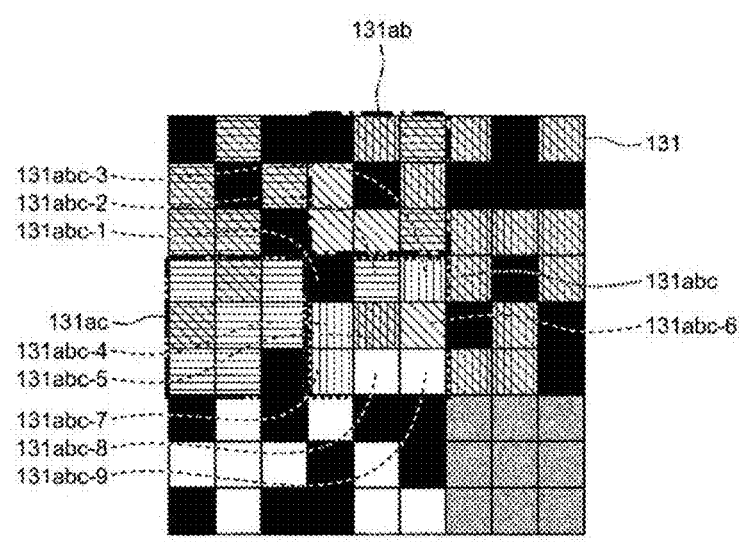
FIG. 15 illustrates an example of filters set in light transmission/blocking adjustment regions in overlapping regions of specific sub-area masks.

In a case where the sub-area masks 131a to 131c are mask patterns including transmission regions and light-blocking regions as illustrated in FIG. 14, a specific configuration example of the sub-area optical characteristic conversion modulation mask 131 will now be described with reference to an example of a filter actually configured in the light transmission/blocking adjustment regions on the overlapping region 131abc as illustrated in FIG. 15.

In FIG. 14, each of the sub-area masks 131a to 131c is configured to have 6×6 light transmission/blocking adjustment regions in the horizontal and vertical directions, with the transmission regions represented by white squares and the light-blocking regions represented by black squares.

Specifically, the sub-area mask 131a in FIG. 14 has, in the order from the upper left transmission/light-blocking adjustment region toward the right and downward, light-blocking, transmission, light-blocking, light-blocking, light-blocking, transmission, transmission, light-blocking, transmission, transmission, light-blocking, light-blocking, transmission, transmission, light-blocking, transmission, transmission, transmission, light-blocking, transmission, transmission, transmission, light-blocking, transmission, transmission, light-blocking, transmission, light-blocking, transmission, light-blocking, light-blocking, transmission, transmission, transmission, light-blocking, light-blocking, transmission, light-blocking (each indicating "region" but omitted).

The sub-area mask 131b in FIG. 14 has, in the order from the upper left transmission/light-blocking adjustment region toward the right and downward, light-blocking, transmission, light-blocking, transmission, light-blocking, transmission, transmission, light-blocking, transmission, light-blocking, light-blocking, light-blocking, transmission, transmission, light-blocking, transmission, transmission, transmission, light-blocking, light-blocking, transmission, transmission, light-blocking, transmission, transmission, transmission, light-blocking, transmission, light-blocking, transmission, transmission, light-blocking (each indicating "region" but omitted).

The sub-area mask 131c in FIG. 14 has, in the order from the upper left transmission/light-blocking adjustment region toward the right and downward, transmission, light-blocking, transmission, light-blocking, transmission, transmission, light-blocking, transmission, transmission, transmission, light-blocking, light-blocking, light-blocking, transmission, light-blocking, transmission, light-blocking, transmission, transmission, light-blocking, transmission, light-blocking, transmission, light-blocking, transmission, light-blocking, light-blocking, transmission, transmission, light-blocking, transmission, light-blocking, light-blocking, transmission, light-blocking, light-blocking, transmission, transmission (each indicating "region" but omitted).

As illustrated in FIG. 14, each of the sub-area masks 131a to 131c has filters, which allow incident light having predetermined optical characteristics to pass through, arranged in the transmission regions in their light transmission/blocking adjustment regions, thereby converting the incident light into modulated light having the predetermined optical characteristics.

More specifically in the sub-area mask 131a, a filter that allows incident horizontally polarized blue light to pass through is arranged in each transmission region, in the sub-area mask 131b, a filter that allows incident vertically polarized blue light to pass through is arranged in each transmission region, and in the sub-area mask 131c, a filter that allows incident unpolarized red light to pass through is arranged in each transmission region.

However, since the sub-area masks 131a to 131c are theoretical structures, the light transmission/blocking adjustment regions in the overlapping region 131abc where they overlap need to have a configuration in which the transmission regions and light-blocking regions of the light transmission/blocking adjustment regions of each of the sub-area masks 131a to 131c are combined.

Specifically in the sub-area mask 131a in FIG. 14, the overlapping region 131abc is composed of light transmission/blocking adjustment regions A1 to A9, in the sub-area mask 131b, the overlapping region 131abc is composed of light transmission/blocking adjustment regions B1 to B9, and in the sub-area mask 131c, the overlapping region 131abc is composed of light transmission/blocking adjustment regions C1 to C9.

As a result, as illustrated in FIG. 15, a light transmission/blocking adjustment region 131abc-1 in the overlapping region 131abc of the sub-area optical characteristic conversion modulation mask 131 is a region where the light transmission/blocking adjustment regions A1, B1, and C1 of the sub-area masks 131a to 131c overlap with each other.

Since the light transmission/blocking adjustment regions A1, B1, and C1 are all light-blocking regions, the light transmission/blocking adjustment region 131abc-1 is set as a light-blocking region as illustrated in the bottom row in FIG. 13.

As illustrated in FIG. 15, a light transmission/blocking adjustment region 131abc-2 in the overlapping region 131abc of the sub-area optical characteristic conversion modulation mask 131 is a region where the light transmission/blocking adjustment regions A2, B2, and C2 of the sub-area masks 131a to 131c overlap with each other.

Since the light transmission/blocking adjustment regions A2 and C2 are transmission regions and the light transmission/blocking adjustment region B2 is a light-blocking region, the light transmission/blocking adjustment region 131abc-2 is set as a horizontal polarization filter as illustrated in the third row in FIG. 13.

As illustrated in FIG. 15, a light transmission/blocking adjustment region 131abc-3 in the overlapping region 131abc of the sub-area optical characteristic conversion modulation mask 131 is a region where the light transmission/blocking adjustment regions A3, B3, and C3 of the sub-area masks 131*a* to 131*c* overlap with each other.

Since the light transmission/blocking adjustment regions B3 and C3 are transmission regions and the light transmission/blocking adjustment region A3 is a light-blocking region, the light transmission/blocking adjustment region 131*abc*-3 is set as a vertical polarization filter as illustrated in the fifth row in FIG. 13.

As illustrated in FIG. 15, a light transmission/blocking adjustment region 131*abc*-4 in the overlapping region 131*abc* of the sub-area optical characteristic conversion modulation mask 131 is a region where the light transmission/blocking adjustment regions A4, B4, and C4 of the sub-area masks 131*a* to 131*c* overlap with each other.

Since the light transmission/blocking adjustment regions B4 and C4 are transmission regions and the light transmission/blocking adjustment region A4 is a light-blocking region, the light transmission/blocking adjustment region 131*abc*-4 is set as a vertical polarization filter as illustrated in the fifth row in FIG. 13.

As illustrated in FIG. 15, a light transmission/blocking adjustment region 131*abc*-5 in the overlapping region 131*abc* of the sub-area optical characteristic conversion modulation mask 131 is a region where the light transmission/blocking adjustment regions A5, B5, and C5 of the sub-area masks 131*a* to 131*c* overlap with each other.

Since the light transmission/blocking adjustment region B5 is a transmission region and the light transmission/blocking adjustment regions A5 and C5 are light-blocking regions, the light transmission/blocking adjustment region 131*abc*-5 is set as a filter in which a vertical polarization filter and a blue spectral filter are combined as illustrated in the sixth row in FIG. 13.

As illustrated in FIG. 15, a light transmission/blocking adjustment region 131*abc*-6 in the overlapping region 131*abc* of the sub-area optical characteristic conversion modulation mask 131 is a region where the light transmission/blocking adjustment regions A6, B6, and C6 of the sub-area masks 131*a* to 131*c* overlap with each other.

Since the light transmission/blocking adjustment regions A6 and B6 are transmission regions and the light transmission/blocking adjustment region C6 is a light-blocking region, the light transmission/blocking adjustment region 131*abc*-6 is set as a blue spectral filter as illustrated in the second row in FIG. 13.

As illustrated in FIG. 15, a light transmission/blocking adjustment region 131*abc*-7 in the overlapping region 131*abc* of the sub-area optical characteristic conversion modulation mask 131 is a region where the light transmission/blocking adjustment regions A7, B7, and C7 of the sub-area masks 131*a* to 131*c* overlap with each other.

Since the light transmission/blocking adjustment regions B7 and C7 are transmission regions and the light transmission/blocking adjustment region A7 is a light-blocking region, the light transmission/blocking adjustment region 131*abc*-7 is set as a vertical polarization filter as illustrated in the fifth row in FIG. 13.

As illustrated in FIG. 15, a light transmission/blocking adjustment region 131*abc*-8 in the overlapping region 131*abc* of the sub-area optical characteristic conversion modulation mask 131 is a region where the light transmission/blocking adjustment regions A8, B8, and C8 of the sub-area masks 131*a* to 131*c* overlap with each other.

Since the light transmission/blocking adjustment regions A8, B8, and C8 are all transmission regions, the light transmission/blocking adjustment region 131*abc*-8 is set as a transmission region, that is, a filter in which a non-polarization filter and a non-spectral filter, or an opening, as illustrated in the top row in FIG. 13.

As illustrated in FIG. 15, a light transmission/blocking adjustment region 131*abc*-9 in the overlapping region 131*abc* of the sub-area optical characteristic conversion modulation mask 131 is a region where the light transmission/blocking adjustment regions A9, B9, and C9 of the sub-area masks 131*a* to 131*c* overlap with each other.

Since the light transmission/blocking adjustment region C9 is a transmission region and the light transmission/blocking adjustment regions A9 and B9 are light-blocking regions, the light transmission/blocking adjustment region 131*abc*-9 is set as a red spectral filter as illustrated in the eighth row in FIG. 13.

Thus, the overlapping region 131*abc* of the sub-area masks 131*a* to 131*c* in FIG. 14 has the configuration as illustrated in FIG. 15.

With this configuration, for the incident light that passes through the filter 132*a* and enters the imaging element 133 among the incident light that passes through the overlapping region 131*abc*, the overlapping region 131*abc* functions as the sub-area mask 131*a*, and converts the incident light into modulated light having optical characteristics of vertically polarized blue light.

For the incident light that passes through the filter 132*b* and enters the imaging element 133 among the incident light that passes through the overlapping region 131*abc*, the overlapping region 131*abc* functions as the sub-area mask 131*b*, and converts the incident light into modulated light having optical characteristics of horizontally polarized blue light.

For the incident light that passes through the filter 132*c* and enters the imaging element 133 among the incident light that passes through the overlapping region 131*abc*, the overlapping region 131*abc* functions as the sub-area mask 131*c*, and converts the incident light into modulated light having optical characteristics of unpolarized red light.

This arrangement in which the sub-area masks 131*a* to 131*c* overlap with each other to form the overlapping region 131*abc* makes it possible to reduce the size of the sub-area optical characteristic conversion modulation mask 131 as a whole.

Further, the arrangement in which the sub-area masks 131*a* to 131*c* overlap with each other to form the overlapping region 131*abc* allows the filters 132*a* to 132*c* of the sub-area selection transmission filter 132 to be arranged closely together so that only the size substantially equivalent to the filter 132*d* is set in the margin region, thereby improving the area utilization efficiency of the imaging element 133.

Furthermore, the margin region to be set on the imaging element 133 can be reduced, thereby improving the area utilization efficiency of the imaging element 133 and thus improving the image quality of the final reconstructed image.

As described with reference to FIG. 6, in object recognition processing performed based on a modulated image, even when the reconstruction unit 134 performs processing for obtaining a feature vector required for the object recognition processing for each sub-area in parallel processing, and then the object recognition processing is performed based on the feature vector for each sub-area, it is possible to improve the object recognition accuracy as the area utilization efficiency of the imaging element 133 is improved.

In the actual sub-area optical characteristic conversion modulation mask 131, based on the theoretical sub-area masks 131a to 131c, the filters of the application example described with reference to FIG. 13 are arranged in the light transmission/blocking adjustment regions, as illustrated in FIG. 15.

In addition, for each of the overlapping regions 131ab and 131ac, it is possible to configure the light transmission/blocking adjustment regions in the overlapping region in a similar manner by setting filters such as that illustrated in FIG. 13, based on the transmission regions or the light-blocking regions of each sub-area mask.

Specifically, the overlapping region 131abc requires filters of the two states of a transmission region and a light-blocking region for each of the three sub-area masks 131a to 131c, which requires eight (=2×2×2) types of filters for the light transmission/blocking adjustment regions as described with reference to FIG. 13.

On the other hand, for the overlapping regions 131ab and 131ac, four (=2×2) types of filters of the two states for each of the two sheets can be set in the light transmission/blocking adjustment regions.

An example has been described above in which a combination of a red spectral component and a blue spectral component is used as one of the separation axes of the optical characteristics, but other color combinations may be used as long as they are combinations of wavelength bands that are orthogonal to each other.

3. Generalization

An example has been described above in which the filters 132a to 132c of the sub-area selection transmission filter 132 allow modulated light having the optical characteristics of vertically polarized blue, horizontally polarized blue light, and unpolarized red light, respectively, to pass through, so that the sub-area masks 131a to 131c can be arranged to overlap with each other so as to form a theoretical overlapping region, thereby reducing the margin region between the filters 132a to 132c and thus improving the area utilization efficiency of the imaging element 133.

The optical characteristics that allow light to pass through the filters 132a to 132c of the sub-area selection transmission filter 132 may be other than the above-described vertically polarized blue light, horizontally polarized blue light, and unpolarized red light, respectively as long as they have orthogonal optical characteristics.

However, the optical characteristics that allow light to pass through the filters 132a to 132c have a predetermined relationship, and the relationship can be generalized.

Now consider optical characteristics A and A' and optical characteristics B and B' as two general orthogonal optical characteristics. In the case where the two types of separation axes for the optical characteristics A and A' and the optical characteristics B and B' are polarization and spectroscopy, for the optical characteristics A of horizontally polarized light, the associated orthogonal optical characteristics are of vertically polarized light, and are represented as the optical characteristics A'. For the optical characteristics B of blue spectral light, the associated orthogonal optical characteristics are of red spectral light, and are represented as the optical characteristics B'.

In this case, for example, the filter 132a of the sub-area selection transmission filter 132 described with reference to FIGS. 9 to 13 above allows modulated light having the optical characteristics of horizontally polarized blue light to pass through, and therefore can be represented as transmitting modulated light having optical characteristics AB that include both the optical characteristics A and B.

The filter 132b allows modulated light having the optical characteristics of vertically polarized blue light to pass through, and therefore can be represented as transmitting modulated light having optical characteristics A'B that include both the optical characteristics A' and B.

The filter 132c allows modulated light having the optical characteristics of unpolarized red light to pass through, and therefore can be represented as transmitting modulated light having the optical characteristics B'.

Figure 16:
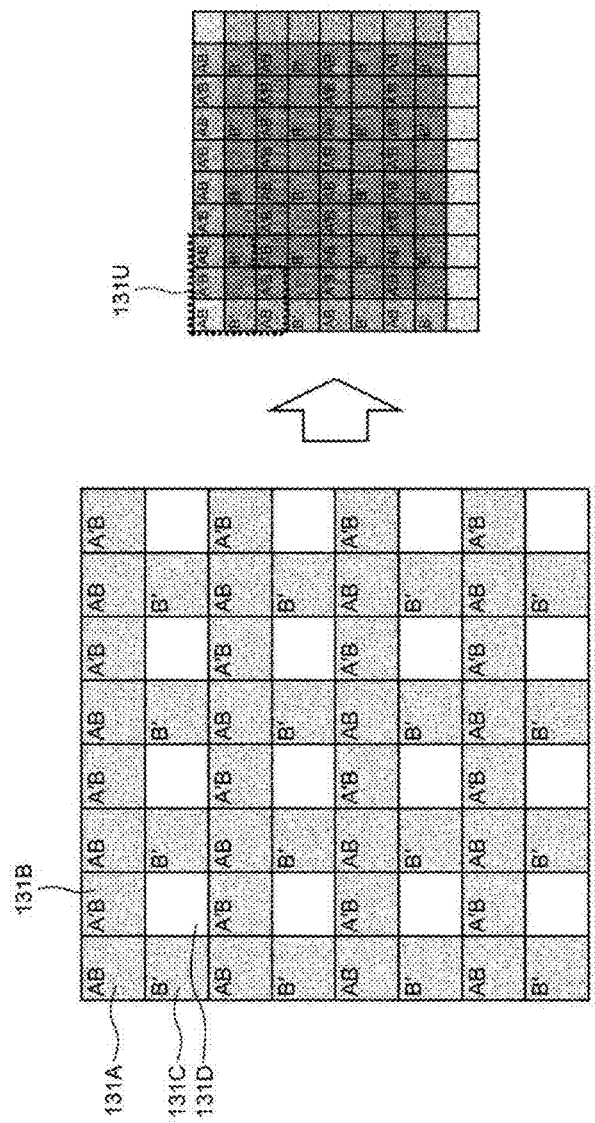
FIG. 16 illustrates a generalized array example of sub-area masks.

In this case, it is assumed that generalized sub-area masks for the filters 132a to 132c in FIGS. 9 to 13 are represented as sub-area masks 131A to 131C illustrated on the left side of FIG. 16, for example.

Here, the sub-area mask 131A for the filter 132a that allows modulated light having the optical characteristics AB to pass through converts the incident light into modulated light having the optical characteristics AB.

The sub-area mask 131B for the filter 132b that allows modulated light having the optical characteristics A'B to pass through converts the incident light into modulated light having the optical characteristics A'B.

The sub-area mask 131c for the filter 132c that allows modulated light having the optical characteristics B to pass through converts the incident light into modulated light having the optical characteristics B.

If a margin region is set on the imaging element 133 in the conventional manner, the sub-area masks 131A to 131C are arranged as illustrated on the left side of FIG. 16. On the left side of FIG. 16, a sub-area mask 131D represented by a white square corresponds to the sub-area mask 131d described above, and represents that a region on the imaging element 133 for the corresponding filter 132d is set in the margin region.

These sub-area masks 131A to 131C overlap with each other to form a sub-area mask unit 131u in the same manner as the sub-area masks 131a to 131c in FIG. 11, so that the filters 132a to 132c can be arranged to overlap with each other in the horizontal and vertical directions by each size of the filters 132a to 132c, with a sub-area mask unit 131U set as a unit, as illustrated on the right side of FIG. 16.

This allows the filters 132a to 132c to be arranged closely together so that the margin region can be reduced to only the region corresponding to the filter 132d, thereby improving the area utilization efficiency of the imaging element 133.

In this case, filters having optical characteristics as illustrated in FIG. 17 are arranged in the light transmission/blocking adjustment regions in an overlapping region 131ABC (not illustrated) corresponding to the overlapping region 131abc, where the sub-area masks 131A to 131C overlap with each other.

Specifically, in the light transmission/blocking adjustment regions that transmit incident light having the optical characteristics AB (Type: AB), the optical characteristics A'B (Type: A'B), and the optical characteristics B' (Type: B') as illustrated in the top row on the left side of FIG. 17, a filter that does not have either the optical characteristics A or B (or an opening without a filter) (white) is formed as illustrated in the top row on the right side of FIG. 17.

In the light transmission/blocking adjustment regions that transmit incident light having the optical characteristics AB (Type: AB) and the optical characteristics A'B (Type: A'B) and block incident light having the optical characteristics B' (Type: B') as illustrated in the second row on the left side in FIG. 17, a filter that allows incident light having the optical characteristics B to pass through is formed as illustrated in the second row on the right side of FIG. 17.

In the light transmission/blocking adjustment regions that transmit incident light having the optical characteristics AB (Type: AB) and the optical characteristics B' (Type: B') and block the optical characteristics A'B (Type: A'B) as illustrated in the third row on the left side of FIG. 17, a filter that allows the optical characteristics A to pass through is formed as illustrated in the third row on the right side of FIG. 17.

In the light transmission/blocking adjustment regions that transmit incident light having the optical characteristics AB (Type: AB) and block incident light having the optical characteristics A'B (Type: A'B) and the optical characteristics B' (Type: B') as illustrated in the fourth row on the left side of FIG. 17, a filter that allows incident light having the optical characteristics AB to pass through is formed as illustrated in the fourth row on the right side of FIG. 17.

In the light transmission/blocking adjustment regions that transmit incident light having the optical characteristics A'B (Type: A'B) and the optical characteristics B' (Type: B') and block incident light having the optical characteristics AB (Type: AB) as illustrated in the fifth row on the left side in FIG. 17, a filter that allows incident light having the optical characteristics A' to pass through is formed as illustrated in the fifth row on the right side of FIG. 17.

In the light transmission/blocking adjustment regions that transmit incident light having the optical characteristics A'B (Type: A'B) and block incident light having the optical characteristics AB (Type: AB) and the optical characteristics B' (Type: B') as illustrated in the sixth row on the left side in FIG. 17, a filter that allows incident light having the optical characteristics A'B to pass through is formed as illustrated in the sixth row on the right side of FIG. 17.

In the light transmission/blocking adjustment regions that transmit incident light having the optical characteristics B' (Type: B') and block incident light having the optical characteristics AB (Type: AB) and the optical characteristics A'B (Type: A'B) as illustrated in the seventh row on the left side of FIG. 17, a filter that allows incident light having the optical characteristics B' to pass through is formed as illustrated in the seventh row on the right side of FIG. 17.

In the light transmission/blocking adjustment regions that block incident light having the optical characteristics AB (Type: AB), the optical characteristics A'B (Type: A'B), and the optical characteristics B' (Type: B') as illustrated in the bottom row on the left side of FIG. 17, a light-blocking region (black) is formed as illustrated in the bottom row on the right side of FIG. 17.

In this way, the filters 132a to 132c are configured on the imaging element 133 using three types of filters that can be realized using two general orthogonal optical characteristics including the optical characteristics A and A' and the optical characteristics B and B' as separation axes; and the sub-area masks 131A to 131C that convert light into modulated light having their corresponding optical characteristics are configured and arranged to overlap with each other, which allows the filters 132a to 132c to be arranged closely together, so that it is possible to suppress the margin region to be set on the imaging element 133 and thus improve the area utilization efficiency for imaging.

Here, as illustrated on the left side of FIG. 16, there is a general arrangement rule for the optical characteristics to be converted in the sub-area masks 131A to 131C.

Specifically, when the optical characteristics A and A' are represented as a first separation axis of optical characteristics, and the optical characteristics B and B' are represented as a second separation axis of optical characteristics, on the left side of FIG. 16, the adjacent columns in the odd-numbered rows are separated by the first separation axis, as in the sub-area masks 131A and 131B, while in the even-numbered rows, there is no separation by the first separation axis because of only the sub-area mask 131C.

Hereinafter, a row in which the adjacent columns are separated by the first separation axis as the optical characteristics A and A', such as the odd rows each including the sub-area masks 131A and 131B on the left side of FIG. 16, will be referred to as a separated row; a row in which there is no separation by either the first separation axis or the second separation axis, such as the even-numbered rows each including the sub-area masks 131C, will be referred to as a non-separated row.

As illustrated on the left side of FIG. 16, the sub-area masks 131A and 131B convert light into modulated light having the optical characteristics B, while the sub-area mask 131C formed in the row below converts light into modulated light having the optical characteristics B'. In other words, on the left side of FIG. 16, the adjacent rows including the odd-numbered and even-numbered rows are separated by the second separation axis.

In this way, the separated rows based on the first separation axis and the non-separated rows are alternately arranged, and the non-separated rows in the first separation axis and the separated rows are arranged to be separated by the second separation axis.

The odd-numbered or even-numbered rows to be separated by the first and second separation axes, and the first and second separation axes, may be interchanged, respectively.

The sub-area masks 131A to 131C thus arranged are arranged to overlap with each other as the sub-area mask unit 131U, and the resulting sub-area mask units 131U are further arranged to overlap with each other in the horizontal and vertical directions by each size of the filters 132a to 132c, thereby making it possible to reduce the margin region in the imaging element 133 to a size equivalent to that of the filter 132d.

<Generalized Example in which Relationship Between Rows and Columns in FIG. 16 is Reversed>

The generalized example illustrated in FIG. 16 is also applied to the arrangement in which the rows and columns are reversed.

Figure 18:
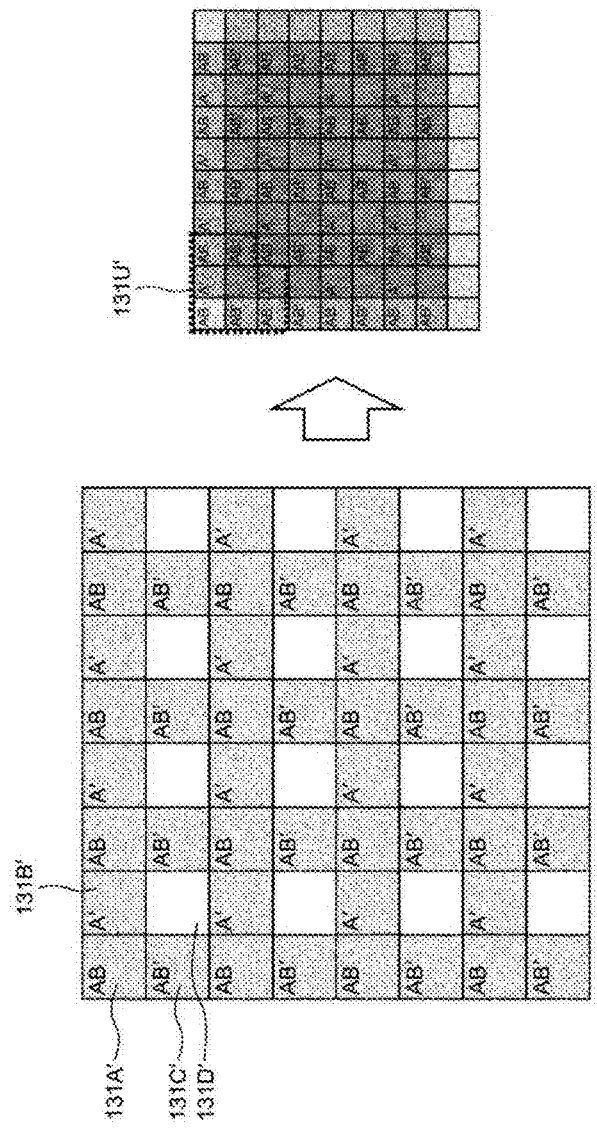
FIG. 18 illustrates a generalized example in which the rows and columns in the arrangement of the sub-area masks of FIG. 16 are reversed.

FIG. 18 illustrates an example in which the relationship between the rows and columns in the generalized example of arrangement of the sub-area masks 131A to 131C illustrated in FIG. 16 is reversed.

On the left side of FIG. 18, an example of arrangement of sub-area masks 131A' to 131C' of the sub-area optical characteristic conversion modulation mask 131 is illustrated in which a conventional margin region is provided in an arrangement in which rows each including the sub-area masks 131A' that convert light into modulated light having the optical characteristics AB and the sub-area masks 131B' that convert light into modulated light having the optical characteristics A' and rows each including the sub-area masks 131C' that convert light into modulated light having the optical characteristics AB' are arranged alternately.

Specifically, from the top of FIG. 18 in the first column on the left side of that figure, the sub-area mask 131A' that converts incident light into modulated light having the optical characteristics AB is arranged, the sub-area mask 131C' that converts incident light into modulated light having the optical characteristics AB' is arranged below the sub-area mask 131A', and the sub-area masks 131A' and 131C' are arranged alternately in the same way.

From the top of FIG. 18 in the second column on the left side of that figure, the sub-area masks 131B' that convert incident light into modulated light having the optical characteristics A' and the blank sub-area masks 131D' that are set in margin regions and allow the incident light to pass through are arranged alternately. Thereafter, the first column name and the second column on the left side of FIG. 18 are alternately repeated in the horizontal direction.

On the left side of FIG. 18, the right half of the sub-area mask 131A' and the left half of the sub-area mask 131B' are arranged to overlap with each other, and the lower half of the sub-area mask 131A' and the upper half of the sub-area mask 131C' are arranged to overlap with each other, thereby forming a sub-area mask unit 131U'. Further, the sub-area mask units 131U' are arranged to overlap with each other in the horizontal and vertical directions by approximately the same size as each of the filters 132a to 132c in the sub-area selection transmission filter 132, thereby forming a sub-area optical characteristic conversion modulation mask 131 as illustrated on the right side of FIG. 18.

In the sub-area optical characteristic conversion modulation mask 131 illustrated on the right side of FIG. 18, the region except for the ends is also an overlapping region where the sub-area masks 131A' to 131C' overlap with each other.

Specifically, in FIG. 18, when the optical characteristics A and A' are represented as a first separation axis of optical characteristics, and the optical characteristics B and B' are represented as a second separation axis of optical characteristics, the adjacent rows in the odd-numbered columns are separated by the second separation axis, as in the sub-area masks 131A' and 131C', while in the even-numbered rows, there is no separation by the second separation axis as represented by the sub-area masks 131B'.

Hereinafter, a column in which the adjacent rows are separated by the second separation axis as the optical characteristics B and B', such as the odd columns each including the sub-area masks 131A' and 131C' on the left side of FIG. 18, will be referred to as a separated column; a column in which there is no separation by either the first separation axis or the second separation axis, such as the even-numbered columns each including the sub-area masks 131B', will be referred to as a non-separated column.

As illustrated on the left side of FIG. 18, the sub-area masks 131A' and 131C' convert light into modulated light having the optical characteristics A, while the sub-area mask 131B' formed in the column to the right converts light into modulated light having the optical characteristics A'. In other words, on the left side of FIG. 18, the columns including the odd-numbered and even-numbered columns are separated every other column by the second separation axis.

The odd-numbered or even-numbered columns to be separated by the first and second separation axes, and the first and second separation axes, may be interchanged.

In this way the separated columns based on the second separation axis and the non-separated columns are alternately arranged, and the non-separated columns in the second separation axis and the separated columns are arranged to be separated by the first separation axis.

The sub-area masks 131A' to 131C' thus arranged are arranged to overlap with each other as the sub-area mask unit 131U', and the resulting sub-area mask units 131U' are further arranged to overlap with each other in the horizontal and vertical directions by each size of the filters 132a to 132c, thereby making it possible to reduce the margin region in the imaging element 133 to a size equivalent to that of the filter 132d.

To summarize the generalization described with reference to FIGS. 16 and 18, the sub-area masks 131a to 131c and the filters 132a to 132c are arranged so that either the separated rows based on the first separation axis and the non-separated rows are alternately arranged, and the non-separated rows in the first separation axis and the separated rows are arranged to be separated by the second separation axis; or the separated columns based on the second separation axis and the non-separated columns are alternately arranged, and the non-separated columns in the second separation axis and the separated columns are arranged to be separated by the first separation axis; further, the sub-area masks 131a to 131c form the sub-area mask unit 131u, and the resulting sub-area mask units 131u are arranged to overlap with each other in the horizontal and vertical directions by each size of the filters 132a to 132c. This allows the filters 132a to 132c to be arranged closely together, so that the margin region can be reduced to a size equivalent to the filter 132d.

In other words, in accordance with the embodiment described above with reference to FIGS. 9 to 12, the sub-area masks 131a to 131c and the filters 132a to 132c are arranged so that rows (or columns) in which vertical polarization and horizontal polarization based on polarization, which is the first separation axis, are separated between adjacent columns (or rows), and rows (or columns) in which there is no separation based on polarization, are alternately arranged, and so that rows (or columns) in which vertical polarization and horizontal polarization based on the first separation axis are not separated between adjacent columns (or rows), and rows (or columns) in which they are separated, are separated by blue spectroscopy and red spectroscopy, which are the second separation axis, thereby making it possible to reduce the margin region.

Example of Application of Generalized Example

When the generalized example described with reference to FIG. 16 is applied to the example described with reference to FIGS. 9 to 13, the optical characteristics A, which are the first separation axis, are of horizontally polarized light, the optical characteristics A' are of vertically polarized light, the optical characteristics B, which are the second separation axis, are of blue spectral light, and the optical characteristics A' are of red spectral light.

As long as the generalized example described with reference to FIG. 16 can be applied, the first and second separation axes may be other ones.

Accordingly in accordance with the generalized example described with reference to FIG. 16, an example will be described in which, for example, the optical characteristics A, which are the first separation axis, are of blue spectral light, the optical characteristics A' are of red spectral light, the optical characteristics B, which are the second separation axis, are of horizontally polarized light, and the optical characteristics B' are of vertically polarized light.

In this case, filters to be set in the light transmission/blocking adjustment regions in the overlapping region 131ABC (not illustrated) corresponding to the overlapping region 131abc are as illustrated in FIG. 19.

Specifically, for example, when the optical characteristics A, which are the first separation axis, are of blue spectral light, the optical characteristics A' are of red spectral light, optical characteristics B, which are the second separation axis, are of vertically polarized light, and the optical characteristics B' are of horizontally polarized light, the sub-area mask 131A, which converts light into modulated light having the optical characteristics AB, therefore converts light into vertically polarized blue light.

The sub-area mask 131B, which converts light into modulated light having the optical characteristics A'B, therefore converts light into vertically polarized red light. The sub-area mask 131C, which converts light into modulated light having the optical characteristics B', therefore converts light into horizontally polarized white light (non-spectral, horizontally polarized light).

Specifically, in the light transmission/blocking adjustment regions that transmit vertically polarized blue light, vertically polarized red light, and horizontally polarized white light (non-spectral and horizontally polarized light) as illustrated in the top row on the left side of FIG. 19, a non-polarization and non-spectral filter (or openings without a filter) is formed as illustrated in the top row on the right side of FIG. 19.

In the light transmission/blocking adjustment regions that transmit vertically polarized blue light and vertically polarized red light and block horizontally polarized white light as illustrated in the second row on the left side of FIG. 19, a vertical polarization filter is formed as illustrated in the second row on the right side of FIG. 19.

In the light transmission/blocking adjustment regions that transmit vertically polarized blue light and horizontally polarized white light and block vertically polarized red light as illustrated in the third row on the left side of FIG. 19, a blue spectral filter is formed as illustrated in the third row on the right side of FIG. 19.

In the light transmission/blocking adjustment regions that transmit vertically polarized blue light and block vertically polarized red light and horizontally polarized white light as illustrated in the fourth row on the left side of FIG. 19, a filter in which a vertical polarization filter and a blue spectral filter are combined is formed as illustrated in the fourth row on the right side of FIG. 19.

In the light transmission/blocking adjustment regions that transmit vertically polarized red light and horizontally polarized white light and block vertically polarized blue light as illustrated in the fifth row on the left part of FIG. 19, a red spectral filter is formed as illustrated in the fifth row on the right side of FIG. 19.

In the light transmission/blocking adjustment regions that transmit vertically polarized red light and block vertically polarized blue light and horizontally polarized white light as illustrated in the sixth row on the left side of FIG. 19, a filter in which a vertical polarization filter and a red spectral filter are combined is formed as illustrated in the sixth row on the right side of FIG. 19.

In the light transmission/blocking adjustment regions that transmit horizontally polarized white light and block vertically polarized blue light and vertically polarized red light as illustrated in the seventh row on the left side of FIG. 19, a horizontal polarization filter is formed as illustrated in the seventh row on the right side of FIG. 19.

In the light transmission/blocking adjustment regions that block vertically polarized blue light, vertically polarized red light, and horizontally polarized white light as illustrated in the bottom row on the left side of FIG. 19, a light-blocking region is formed as illustrated in the bottom row on the right side of FIG. 19.

Such a configuration of the sub-area optical characteristic conversion modulation mask 131 and the sub-area selection transmission filter 132 according to the generalized configuration makes it possible to reduce the margin region on the imaging element 133.

As a result, the margin region can be reduced, thereby improving the area utilization efficiency of the imaging element 133.

The improvement of the area utilization efficiency of the imaging element 133 makes it possible to improve the image quality of the final reconstructed image.

Furthermore, as described with reference to FIG. 6, in object recognition processing performed based on a modulated image, even when the reconstruction unit 134 performs processing for obtaining a feature vector required for the object recognition processing for each sub-area in parallel processing, and then the object recognition processing is performed based on the feature vector for each sub-area, it is possible to improve the object recognition accuracy as the area utilization efficiency of the imaging element 133 is improved.

The present disclosure can also be configured as follows.

<1> An imaging device including:
a modulation mask that converts incident light into modulated light by modulating the incident light;
an imaging element that captures a modulated image formed from the modulated light that has passed through the modulation mask;
a selection filter that, for each of a plurality of regions into which an imaging surface on the imaging element is divided, allows the modulated light having optical characteristics that are orthogonal to each other between the regions adjacent to each other, to pass through toward the imaging element; and
a reconstruction unit that reconstructs an image corresponding to the incident light based on the modulated image,
wherein the modulation mask converts, with a sub-area set for each selection filter as a unit, the incident light into modulated light having optical characteristics corresponding to the selection filter based on at least one of polarization and spectroscopy.

<2> The imaging device according to <1>, wherein
the modulation mask includes a theoretical sub-area mask that converts the incident light into modulated light having the optical characteristics corresponding to the selection filter, with the sub-area as a unit,
the sub-area mask is twice as large as the selection filter in a horizontal direction and a vertical direction, and
the sub-area masks for the selection filters adjacent to each other have a structure in which the sub-area masks theoretically partially overlap with each other.

<3> The imaging device according to <2>, wherein
the selection filters are for three types of the orthogonal optical characteristics, and
the sub-area masks are of three types that are for the selection filters to convert the incident light into modulated light having the three types of the orthogonal optical characteristics.

<4> The imaging device according to <3>, wherein the sub-area masks have a structure in which up to three types theoretically overlap.

<5> The imaging device according to <3>, wherein when the three types of the sub-area masks are a first sub-area mask, a second sub-area mask and a third sub-area mask, and a sub-area mask unit is defined as a structure in which the first sub-area mask and the second sub-area mask are theoretically arranged to overlap with each other by half in the horizontal direction and the first sub-area mask and the third sub-area mask are theoretically arranged to overlap with each other by half in the vertical direction, the modulation mask has a structure in which the sub-area mask units are repeatedly arranged to theoretically overlap with each other by a width equivalent to the selection filter in the horizontal direction and the vertical direction.

<6> The imaging device according to <5>, wherein each of the first sub-area mask, the second sub-area mask, and the third sub-area mask has a pattern of light transmission/blocking adjustment regions to convert the incident light into modulated light having optical characteristics corresponding to the respective selection filters, the light transmission/blocking adjustment regions including a transmission region that transmits incident light having optical characteristics corresponding to the respective selection filters among the incident light and a light-blocking region that blocks the incident light.

<7> The imaging device according to <6>, wherein the light transmission/blocking adjustment regions of the modulation mask in an overlapping region in which the first sub-area mask, the second sub-area mask, and the third sub-area mask theoretically overlap with each other are applied with a physical filter that allows incident light having optical characteristics to pass through, the optical characteristics being set according to a pattern of the light transmission/blocking adjustment regions of each of the first sub-area mask, the second sub-area mask, and the third sub-area mask.

<8> The imaging device according to <7>, wherein a physical filter is applied that allows incident light having optical characteristics to pass through, the optical characteristics being set according to a combination of a transmission region or a light-blocking region set in the light transmission/blocking adjustment regions of each of the first sub-area mask, the second sub-area mask, and the third sub-area mask.

<9> The imaging device according to <7>, wherein when the selection filters are a first selection filter, a second selection filter, and a third selection filter for the first sub-area mask, the second sub-area mask, and the third sub-area mask, respectively the first selection filter, the second selection filter, and the third selection filter are in accordance with the arrangement of the first sub-area mask, the second sub-area mask, and the third sub-area mask, respectively the first selection filter and the second selection filter are arranged adjacent to each other in the horizontal direction, and the first selection filter and the third selection filter are arranged adjacent to each other in the vertical direction.

<10> The imaging device according to <8>, wherein for optical characteristics of each of the first sub-area mask, the second sub-area mask, and the third sub-area mask and each of the first selection filter, the second selection filter, and the third selection filter, rows or columns in which adjacent rows or adjacent columns are separated based on the polarization or the spectroscopy, and rows or columns in which adjacent rows or adjacent columns are not separated, are alternately arranged, and rows or columns in which adjacent rows or adjacent columns are not separated based on the polarization or the spectroscopy and rows or columns in which adjacent rows or adjacent columns are separated, are separated based on the polarization or the spectroscopy.

<11> The imaging device according to any one of <1> to <10>, wherein the reconstruction unit reconstructs an image corresponding to the incident light by parallel processing for each region of the modulated image with the selection filter as a unit.

<12> A method for operating an imaging device that includes:
a modulation mask that converts incident light into modulated light by modulating the incident light;
an imaging element that captures a modulated image formed from the modulated light that has passed through the modulation mask;
a selection filter that, for each of a plurality of regions into which an imaging surface on the imaging element is divided, allows the modulated light having optical characteristics that are orthogonal to each other between the regions adjacent to each other, to pass through toward the imaging element; and
a reconstruction unit that reconstructs an image corresponding to the incident light based on the modulated image,
wherein the modulation mask converts, with a sub-area set for each selection filter as a unit, the incident light into modulated light having optical characteristics corresponding to the selection filter based on at least one of polarization and spectroscopy,
the method comprising the steps of:
converting, by the modulation mask, incident light into modulated light by modulating the incident light;
capturing, by the imaging element, a modulated image formed from the modulated light that has passed through the modulation mask;
for each of a plurality of regions into which an imaging surface on the imaging element is divided, allowing, by the selection filter, the modulated light having optical characteristics that are orthogonal to each other between the regions adjacent to each other to pass through toward the imaging element;
reconstructing, by the reconstruction unit, an image corresponding to the incident light based on the modulated image; and
with a sub-area set for each selection filter as a unit, converting, by the modulation mask, the incident light into modulated light having optical characteristics corresponding to the selection filter based on at least one of polarization and spectroscopy.

REFERENCE SIGNS LIST

111 Imaging device
131 Sub-area optical characteristic conversion modulation mask
131a to 131d Sub-area mask
132 Sub-area selection transmission filter
132a to 132d Filter
133 Imaging element
134 Reconstruction unit
135 Output unit

The invention claimed is:
1. An imaging device comprising:
a modulation mask that converts incident light into modulated light by modulating the incident light;
an imaging element that captures a modulated image formed from the modulated light that has passed through the modulation mask;
a selection filter that, for each of a plurality of regions into which an imaging surface on the imaging element is divided, allows the modulated light having optical characteristics that are orthogonal to each other between the regions adjacent to each other, to pass through toward the imaging element; and a reconstruction unit that reconstructs an image corresponding to the incident light based on the modulated image, wherein the modulation mask converts, with a sub-area set for each selection filter as a unit, the incident light into modulated light having optical characteristics corresponding to the selection filter based on at least one of polarization and spectroscopy.

2. The imaging device according to claim 1, wherein
the modulation mask includes a theoretical sub-area mask that converts the incident light into modulated light having the optical characteristics corresponding to the selection filter, with the sub-area as a unit,
the sub-area mask is twice as large as the selection filter in a horizontal direction and a vertical direction, and
the sub-area masks for the selection filters adjacent to each other have a structure in which the sub-area masks theoretically partially overlap with each other.

3. The imaging device according to claim 2, wherein
the selection filters are for three types of the orthogonal optical characteristics, and
the sub-area masks are of three types that are for the selection filters to convert the incident light into modulated light having the three types of the orthogonal optical characteristics.

4. The imaging device according to claim 3, wherein the sub-area masks have a structure in which up to three types theoretically overlap.

5. The imaging device according to claim 3, wherein when the three types of the sub-area masks are a first sub-area mask, a second sub-area mask and a third sub-area mask, and a sub-area mask unit is defined as a structure in which the first sub-area mask and the second sub-area mask are theoretically arranged to overlap with each other by half in the horizontal direction and the first sub-area mask and the third sub-area mask are theoretically arranged to overlap with each other by half in the vertical direction, the modulation mask has a structure in which the sub-area mask units are repeatedly arranged to theoretically overlap with each other by a width equivalent to the selection filter in the horizontal direction and the vertical direction.

6. The imaging device according to claim 5, wherein each of the first sub-area mask, the second sub-area mask, and the third sub-area mask has a pattern of light transmission/blocking adjustment regions to convert the incident light into modulated light having optical characteristics corresponding to the respective selection filters, the light transmission/blocking adjustment regions including a transmission region that transmits incident light having optical characteristics corresponding to the respective selection filters among the incident light and a light-blocking region that blocks the incident light.

7. The imaging device according to claim 6, wherein the light transmission/blocking adjustment regions of the modulation mask in an overlapping region in which the first sub-area mask, the second sub-area mask, and the third sub-area mask theoretically overlap with each other are applied with a physical filter that allows incident light having optical characteristics to pass through, the optical characteristics being set according to a pattern of the light transmission/blocking adjustment regions of each of the first sub-area mask, the second sub-area mask, and the third sub-area mask.

8. The imaging device according to claim 7, wherein a physical filter is applied that allows incident light having optical characteristics to pass through, the optical characteristics being set according to a combination of a transmission region or a light-blocking region set in the light transmission/blocking adjustment regions of each of the first sub-area mask, the second sub-area mask, and the third sub-area mask.

9. The imaging device according to claim 7, wherein when the selection filters are a first selection filter, a second selection filter, and a third selection filter for the first sub-area mask, the second sub-area mask, and the third sub-area mask, respectively the first selection filter, the second selection filter, and the third selection filter are in accordance with the arrangement of the first sub-area mask, the second sub-area mask, and the third sub-area mask, respectively the first selection filter and the second selection filter are arranged adjacent to each other in the horizontal direction, and the first selection filter and the third selection filter are arranged adjacent to each other in the vertical direction.

10. The imaging device according to claim 8, wherein for optical characteristics of each of the first sub-area mask, the second sub-area mask, and the third sub-area mask and each of the first selection filter, the second selection filter, and the third selection filter, rows or columns in which adjacent rows or adjacent columns are separated based on the polarization or the spectroscopy, and rows or columns in which adjacent rows or adjacent columns are not separated, are alternately arranged, and rows or columns in which adjacent rows or adjacent columns are not separated based on the polarization or the spectroscopy, and rows or columns in which adjacent rows or adjacent columns are separated, are separated based on the polarization or the spectroscopy.

11. The imaging device according to claim 1, wherein the reconstruction unit reconstructs an image corresponding to the incident light by parallel processing for each region of the modulated image with the selection filter as a unit.

12. A method for operating an imaging device that includes:
a modulation mask that converts incident light into modulated light by modulating the incident light;
an imaging element that captures a modulated image formed from the modulated light that has passed through the modulation mask;
a selection filter that, for each of a plurality of regions into which an imaging surface on the imaging element is divided, allows the modulated light having optical characteristics that are orthogonal to each other between the regions adjacent to each other, to pass through toward the imaging element; and
a reconstruction unit that reconstructs an image corresponding to the incident light based on the modulated image,
wherein the modulation mask converts, with a sub-area set for each selection filter as a unit, the incident light into modulated light having optical characteristics corresponding to the selection filter based on at least one of polarization and spectroscopy,
the method comprising the steps of:
converting, by the modulation mask, incident light into modulated light by modulating the incident light;
capturing, by the imaging element, a modulated image formed from the modulated light that has passed through the modulation mask;
for each of a plurality of regions into which an imaging surface on the imaging element is divided, allowing, by the selection filter, the modulated light having optical characteristics that are orthogonal to each other between the regions adjacent to each other to pass through toward the imaging element;

reconstructing, by the reconstruction unit, an image corresponding to the incident light based on the modulated image; and with a sub-area set for each selection filter as a unit, converting, by the modulation mask, the incident light into modulated light having optical characteristics corresponding to the selection filter based on at least one of polarization and spectroscopy.

\* \* \* \* \*